United States Patent
Baltrucki et al.

(10) Patent No.: US 11,162,438 B2
(45) Date of Patent: Nov. 2, 2021

(54) VALVE ACTUATION AND SEQUENCING FOR CYLINDER DEACTIVATION AND HIGH-POWER DENSITY (HPD) BRAKING

(71) Applicant: Jacobs Vehicle Systems, Inc., Bloomfield, CT (US)

(72) Inventors: Justin D. Baltrucki, Canton, CT (US); Robb Janak, Bristol, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 17/301,419

(22) Filed: Apr. 2, 2021

(65) Prior Publication Data

US 2021/0310425 A1 Oct. 7, 2021

Related U.S. Application Data

(60) Provisional application No. 63/004,232, filed on Apr. 2, 2020.

(51) Int. Cl.
*F02D 13/04* (2006.01)
*F01L 1/26* (2006.01)
(Continued)

(52) U.S. Cl.
CPC ............... *F02D 13/04* (2013.01); *F01L 1/26* (2013.01); *F01L 13/0005* (2013.01);
(Continued)

(58) Field of Classification Search
CPC ......... F01L 1/181; F01L 1/26; F01L 13/0005; F01L 2013/001; F01L 13/06; F02D 13/04; F02D 13/06
(Continued)

(56) References Cited

U.S. PATENT DOCUMENTS

| 9,790,824 B2 * | 10/2017 | Baltrucki ............... F01L 13/06 |
| 2020/0018244 A1 | 1/2020 | Kolhouse et al. |
| 2020/0088073 A1 | 3/2020 | Baltrucki et al. |

FOREIGN PATENT DOCUMENTS

| JP | 2001280159 A | 10/2001 |
| JP | 2018145808 A | 9/2018 |
| WO | 2002095203 A1 | 11/2002 |

OTHER PUBLICATIONS

International Search Report for International Application No. PCT/IB2021/052784 dated Jun. 22, 2021, 3 pages.
(Continued)

*Primary Examiner* — Jorge L Leon, Jr.
(74) *Attorney, Agent, or Firm* — Moreno IP Law LLC

(57) ABSTRACT

Systems and methods for controlling valves in valve actuation systems in internal combustion engines systems may be particularly suitable for sequencing valve motion in engine environments that combine cylinder deactivation and high-power density (HPD) engine braking. A main event motion system is configured to produce main event motion in one or more valve sets. An engine braking system produces engine braking motion and a cylinder deactivation system selectively deactivates main event motion of the intake and exhaust valves the valve set. A blocking system selectively prevents the cylinder deactivation system from deactivating main event motion of at least one intake valve during the engine braking operation. Thus, main event intake valve motions may be available for braking operations, such as HPD braking where main event intake valve motion may be used to enhance CR braking. One actuator can control deactivation of paired intake and exhaust main event motion.

19 Claims, 25 Drawing Sheets

(51) Int. Cl.
  *F01L 13/06*  (2006.01)
  *F01L 13/00*  (2006.01)
  *F02D 13/06*  (2006.01)
  *F01L 1/18*   (2006.01)
(52) U.S. Cl.
  CPC .............. *F01L 13/06* (2013.01); *F02D 13/06* (2013.01); *F01L 1/181* (2013.01)
(58) Field of Classification Search
  USPC ..................... 123/90.12, 90.39, 90.4, 198 F
  See application file for complete search history.

(56) References Cited

OTHER PUBLICATIONS

Written Opinion of the International Searching Authority for International Application No. PCT/IB2021/052784 dated Jun. 22, 2021, 4 pages.

\* cited by examiner

VALVE ACTUATION AND SEQUENCING FOR CYLINDER DEACTIVATION AND HIGH-POWER DENSITY (HPD) BRAKING

PRIORITY AND RELATED APPLICATIONS

This application claims priority to U.S. provisional application No. 63/004,232, filed on Apr. 2, 2020, titled "CONTROLLING THE SEQUENCING OF INTAKE AND EXHAUST VALVES WITH LESS ACTUATORS," the subject matter of which is incorporated herein by reference in its entirety.

FIELD

The instant disclosure relates generally to valve actuation systems in internal combustion engines and, in particular, to systems and methods for controlling the sequencing of intake and exhaust valves with actuators. The disclosed systems and methods may be particularly suitable for sequencing valve motion in engine environments that combine cylinder deactivation and high-power density (HPD) engine braking.

BACKGROUND

Known valve actuation systems include auxiliary valve actuation systems that may utilize an auxiliary rocker arm and an auxiliary actuation motion source (e.g., a dedicated auxiliary cam) to provide auxiliary valve motion, which is motion that is in addition to main event valve motion. Main event valve motion refers to typical intake and exhaust valve motion that facilitates positive power production (i.e., the controlled intake, compression, combustion and exhaust strokes) in a typical four-stroke engine cycle in an associated cylinder. For example, such auxiliary valve actuation systems and associated valve motions may provide compression-release (CR) engine braking or any of a number of auxiliary valve events or variable main event timing or variable valve timing events (often referred to as variable valve actuation or VVA) such as, but not limited to, late intake valve closing (LIVC), early exhaust valve opening (EEVO), early intake valve closing (EIVC) and/or late intake valve opening (LIVO).

Various types of CR engine braking are known in the art. Generally, CR engine braking occurs when an engine's cylinders are operated in an unfueled stated to essentially act as air compressors, thereby providing vehicle retarding power through the vehicle's drive train. So-called 2-stroke or high-power density (HPD) compression-release engine braking provides for two CR events for each cycle of the engine, which provides increased retarding power as compared to conventional CR systems where only a single CR event is provided for each cycle of the engine. In some versions of HPD braking systems, it is necessary to allow the main intake and exhaust valve actuation motions to be "lost" (not conveyed to the engine valves) in favor of the auxiliary valve actuation motions that implement the HPD engine braking.

As is further known in the art, valve actuation systems may be configured to deactivate cylinders in an internal combustion engine. Typically, systems implementing cylinder deactivation (CDA) include mechanisms that permit the intake and exhaust valves to be decoupled from any valve actuation motions source, thereby preventing valve actuation of the intake and exhaust valves. Often, to the extent that such CDA systems are hydraulically actuated, one or more actuators (e.g., high speed solenoids) may be employed to control application of hydraulic fluid to the CDA mechanisms. Given the common feature of requiring decoupling of main intake and exhaust valve events, systems providing both 2-stroke HPD CR engine braking and CDA may be readily conceived.

However, compatibility of CDA with other types of CR engine braking are not as readily achieved. With 2-Stroke HPD, cylinder deactivation mechanisms eliminate the main intake and exhaust valve events, allowing the intake and exhaust braking rocker arms to provide two intake events, two CR events and two brake gas recirculation (BGR) events per cam rotation (engine cycle). In so-called 1.5-stroke HPD, the main exhaust event is deactivated; however, main intake valve events are not deactivated, and no additional intake lift events are provided to support the second CR event. The normal intake is provided for the first CR, and gases used in the second compression-release event are generated solely by the recirculation of exhaust manifold gases, without drawing air from the intake manifold. An example of such 1.5-stroke HPD valve actuation motions are illustrated in FIG. 1. As shown, the usual main exhaust valve actuation valve motions are lost (which would otherwise typically occur at approximately 180 to 300 degrees of crank angle in the illustrated example) and replaced with auxiliary valve actuation motions comprising two CR events 120 and two BGR events 122, 124. As further shown, unlike the main exhaust events, main intake valve events 134 are not lost but instead operate to provide gases for a first CR event 120 (centered as 0 degrees crank angle in the illustrated example).

Given the requirement to continue main intake events during 1.5-stroke HPD engine braking, it is not feasible to rely on CDA mechanisms that would otherwise deactivate both exhaust and intake main events. To overcome this limitation, it is possible to provide independent control of each set of intake and exhaust valves through the provision of separate actuators for each set. For example, in a six-cylinder engine, this would require 12 separate actuators—six actuators for the intake valves and six actuators for the exhaust valves. Thus, during CDA operation, all twelve actuators would be operated to cause deactivation of all sets of intake and exhaust valves. Further, during 1.5-stroke HPD, the six actuators for the exhaust valves are operated to deactivate the exhaust valves, but the six actuators for the intake valves are operated to still permit actuation of the intake valves according to main valve events. While this configuration is possible, the cost and space requirements incurred by providing separate actuators as well as the increased complexity of the system, including, for example, adding required additional, separate, hydraulic passages for each deactivation mechanism, would be prohibitive.

Thus, systems and related methods implementing cooperative valve actuation motion sources without the above-noted drawbacks would represent an advancement of the art.

SUMMARY

Aspects of the disclosure provide a system for controlling valve motion that is particularly suited for engine environments that employ cylinder deactivation as well as high-power density (HPD) engine braking. A blocking system may be provided for preventing deactivation of main event motion in intake valves in one or more cylinders when engine braking is performed in combination with cylinder deactivation. The system may be implemented with a blocking solenoid valve that is arranged and adapted to control one or more blocking elements, such as spool valves situated within valvetrain components, such as rocker arms, each associated with an engine cylinder. Control may be facilitated by a hydraulic network of passages or hydraulic links within valvetrain components.

According to one aspect of the disclosure, a system for controlling valve motion to facilitate cylinder deactivation and high-power density (HPD) engine braking in an internal combustion engine having at least one cylinder may comprise: a valve set associated with each of the at least one cylinder, each of the valve sets comprising at least one intake valve and at least one exhaust valve; a main event motion system configured to produce main event motion in each of the valve sets; an engine braking system configured to produce engine braking motion during an engine braking operation by adding motion to at least one of the exhaust valves; a cylinder deactivation system configured to selectively deactivate main event motion of the intake and exhaust valves in at least one valve set; and a blocking system configured to selectively prevent the cylinder deactivation system from deactivating main event motion of at least one intake valve during the engine braking operation.

According to a further aspect, the system for controlling valve motion may comprise an engine braking system that is configured to produce at least two compression release events for each cycle of the internal combustion engine. According to a further aspect, the system for controlling valve motion may comprise at least one valve bridge, and the cylinder deactivation system may include a collapsing feature on the at least one valve bridge. According to a further aspect, the system for controlling valve motion may comprise a deactivation system that is configured to deactivate main event motion in response to hydraulic pressure, and a blocking system that is configured to prevent hydraulic pressure in the intake portion of the cylinder deactivation system. According to a further aspect, the system for controlling valve motion may comprise a deactivation system that is configured to deactivate main event motion in response to hydraulic pressure, and the blocking system may be configured to permit hydraulic pressure in the cylinder deactivation system.

According to a further aspect, the system for controlling valve motion may comprise an engine braking system with a dedicated brake rocker associated with at least one of the exhaust valves. According to a further aspect, the system for controlling valve motion may comprise a blocking system comprising a blocking solenoid valve arranged to control the flow of hydraulic fluid to selectively prevent the cylinder deactivation system from deactivating main event motion of intake valves in one valve set. According to a further aspect, the system for controlling valve motion may comprise an engine braking system having a braking solenoid valve arranged to control the flow of hydraulic fluid to produce braking motion in at least one valve set, in which braking motion may be applied on at least one valve associated with least one cylinder. According to a further aspect, the system for controlling valve motion may comprise a cylinder deactivation system having a cylinder deactivation solenoid valve arranged to control the flow of hydraulic fluid to deactivate main event motion of the intake and exhaust valves in at least one valve set. According to a further aspect, the system for controlling valve motion may comprise a blocking system having a valve disposed in a rocker arm, or in (or on) another component in the valve train, such as a rocker shaft or a solenoid manifold and arranged to prevent flow in a hydraulic passage in the valve train component. According to a further aspect, the system for controlling valve motion may comprise a blocking system having a valve arranged to block flow of hydraulic fluid provided by a portion of the cylinder deactivation system that would otherwise be used to deactivate the main event motion of at the least one intake valve.

According to a further aspect of the disclosure, a method of controlling valve motion to facilitate cylinder deactivation and high-power density (HPD) engine braking in an internal combustion engine having at least one cylinder, the system comprising a valve set associated with each of the at least one cylinder, each of the valve sets comprising at least one intake valve and at least one exhaust valve; a main event motion system for producing main event motion in each of the valve sets; an engine braking system for producing engine braking valve motion during an engine braking operation by adding motion to at least one of the exhaust valves; a cylinder deactivation system for selectively deactivating main event motion of the intake and exhaust valves in at least one valve set; and a blocking system for selectively preventing the cylinder deactivation system from deactivating main event motion of at least one intake valve in combination with the engine braking operation, the method comprising: initiating a braking operation in the braking system for at least one of the valve sets; initiating a cylinder deactivation operation in the cylinder deactivation system, the cylinder deactivation operation tending to deactivate main event motion of at least one intake valve in the at least one valve set; and initiating a blocking operation in the blocking system for preventing deactivation of the main event motion of the at least one intake valve.

According to a further aspect, the method of controlling valve motion may further comprise providing at least two compression release events for each cycle of the internal combustion engine. According to a further aspect, the method of controlling valve motion may include main event motion of the at least one intake valve, which main intake event motion may cause the intake valve to open against cylinder pressure and function to enhance a compression release braking event performed in the braking operation.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Generally, the instant disclosure addresses the above-noted shortcomings. In particular, an internal combustion engine in accordance with the instant disclosure comprises a compression-release braking system capable of providing valve actuation motions implementing 2-stroke HPD engine braking as well as a cylinder deactivation system capable of deactivating intake and exhaust valve actuations. In operating the CR braking system and the CDA system, the instant disclosure further provides for preventing deactivation of intake valve actuations (despite operation of the CDA system) when it is desired to provide, for example, 1.5-stroke HPD engine braking. To this end, various system configurations comprising different numbers of actuators and supporting methods for synchronizing operation of such actuators are described herein.

More specifically, various embodiments described herein address ways to reduce the number of actuators so that one actuator can control activation/deactivation of paired intake and exhaust main event motion, but where one of the paths can be selectively blocked so that only the intake or exhaust valve are controlled separately. In a preferred embodiment, control of both intake and exhaust valves is configured for quick reaction times needed for CDA. Then, when 1.5-stroke HPD engine braking is requested, a blocking spool is first actuated to prevent the deactivation of the intake valves when the rest of the braking system is activated. The blocking spool can be configured such that deactivation of intake and exhaust is allowed when braking is not active, and intake deactivation is not allowed when braking is active. Thus, main event intake valve motions may be available for braking operations, such as HPD braking where main event intake valve motion may be used to enhance CR braking. Typically, the blocking spool may keep the CDA oil supply flow path open to supply the CDA oil intake. However, other configurations are contemplated by the disclosure.

Figure 25:
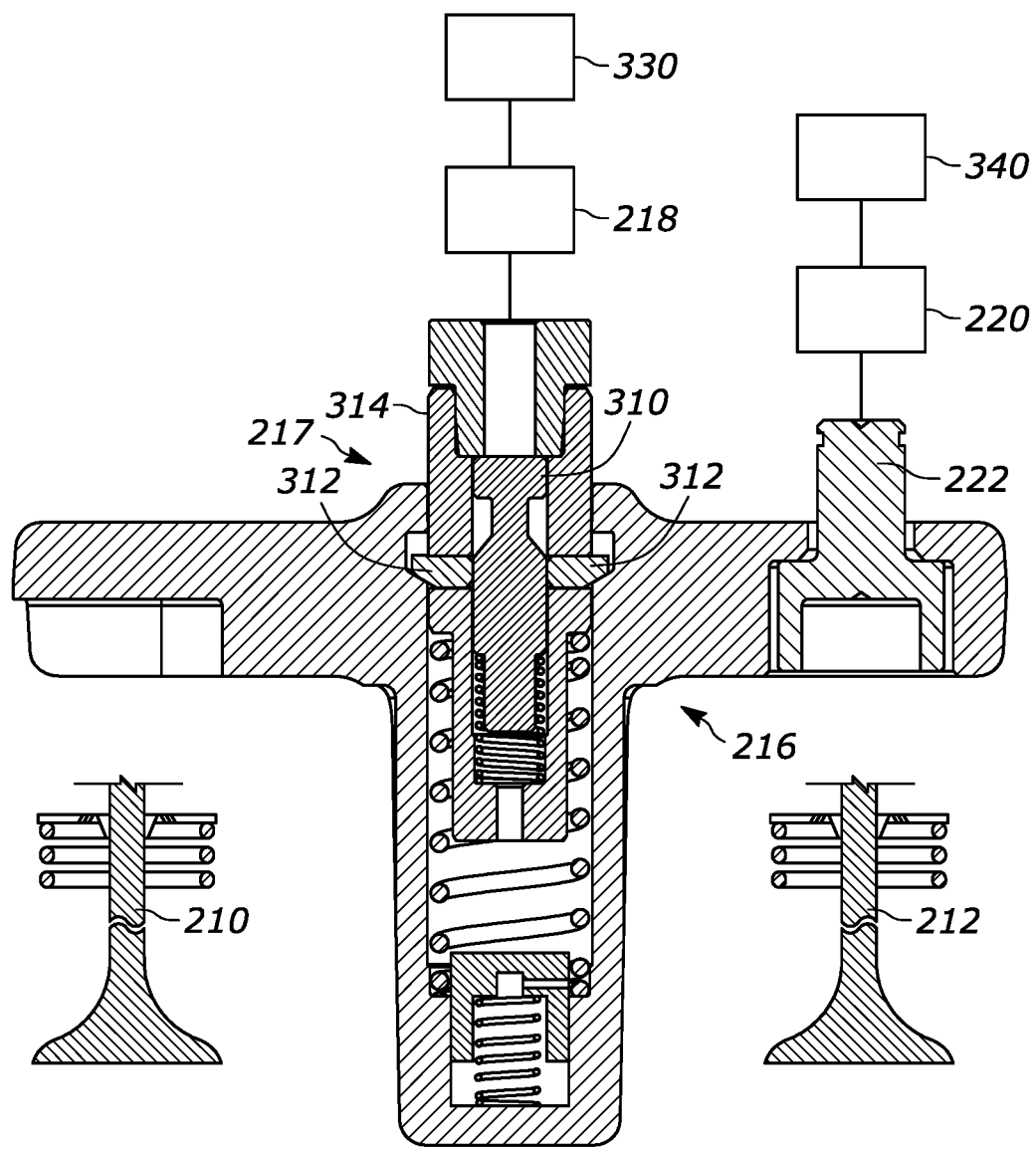
FIG. 25 illustrates an example deactivation mechanism or deactivator suitable for implementing aspects of the instant disclosure.

A first embodiment in accordance with the instant disclosure is illustrated with reference to FIGS. 2-5. In addition, FIG. 25 shows relevant details of example key features of valve actuation system components such as those described in U.S. Pat. No. 9,790,824, which will be useful for further understanding the systems that are schematically depicted in FIGS. 2-22, in which some components have been abbreviated or omitted for clarity.

Figure 1:
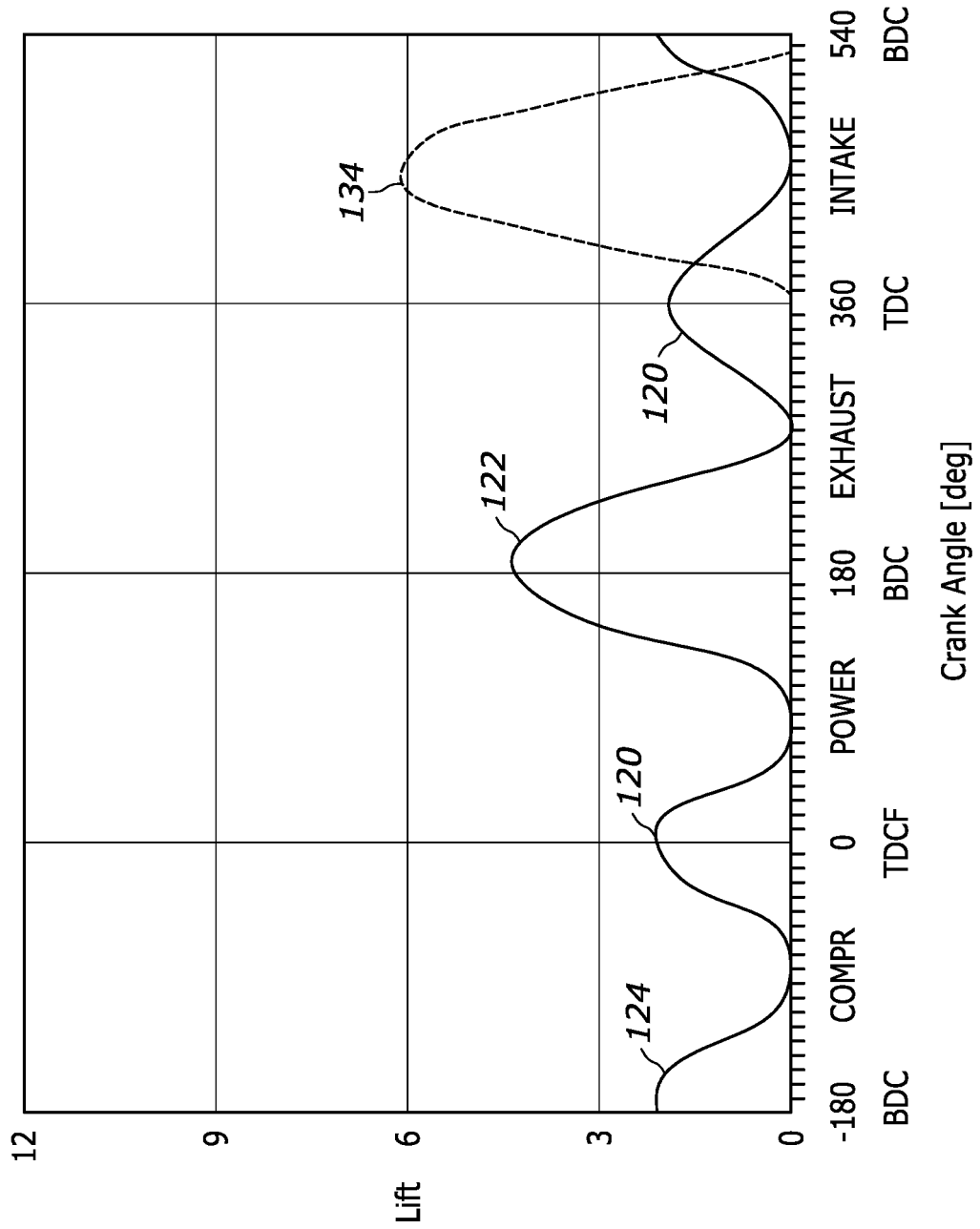
FIG. 1 is a graph that illustrates valve lift as a function of crankshaft angle in a prior art valve actuation sequence for providing 1.5-stroke HPD engine braking.
Figure 2:
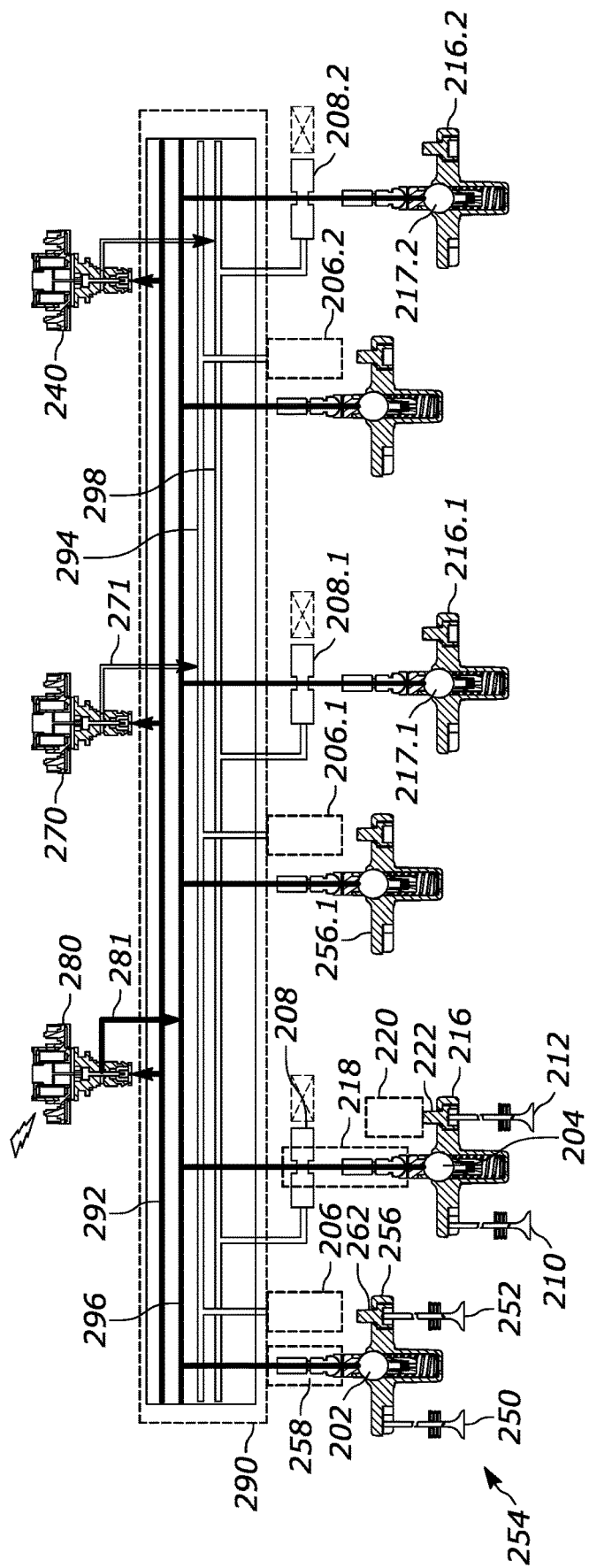
FIGS. 2-5 are schematic diagrams of an example system and actuator sequencing method and technique according to a first embodiment in accordance with the instant disclosure.

Referring to FIGS. 2 and 25, specifically, a main event rocker 218 may be mounted on a rocker shaft 290 for pivoting or rocking movement and may convey main event motion from a main event motion source, such as a cam 330 to a valve bridge 216, which actuates a pair of intake valves 210, 212. An auxiliary rocker arm 220, which may also be mounted on a rocker shaft, may convey auxiliary motion from an auxiliary motion source 340 to the bridge pin 222 of the valve bridge 216 and to one of the intake valves 212. Valve bridge 216 may be equipped with a deactivation mechanism 204 (also referenced generally by 217 in FIG. 25), which may include an inner plunger 310 that may be displaced downward under hydraulic pressure to permit retraction of a pair of wedge elements 312, thus downward movement of an outer plunger 314 within the bridge 216.

A valve set may be associated with each cylinder and may include a pair of intake valves 210, 212 and a pair of exhaust valves 250, 252. Intake valves are actuated by an intake valve actuation system 214 (FIG. 3), which may comprise the intake valve bridge 216, which is driven by a main intake rocker 218 receiving motion from a motion source such as cam 330 (FIG. 25). Intake valve bridge 216 may include a collapsing or deactivating mechanism 204 integrated therein, for deactivating the intake valve bridge 216. An auxiliary intake rocker 220, which may be driven by a cam 340 (FIG. 25) may provide auxiliary motion to one of the intake valves 212 through the intake valve bridge pin 222, which may move independent of the intake valve bridge 216. As will be recognized from the instant disclosure by those of ordinary skill in the art, valve train components, such as intake rocker 218, and other valve train components described below for the exhaust valves, for example, are illustrated only in the leftmost valve set in FIG. 2 and not replicated in the other illustrated valve sets (i.e., associated with bridges 216.1 and 256.1, and bridges 216.2 and 256.2). These features have been illustrated in only one valve set in FIG. 2, and not shown elsewhere, for overall clarity in the figures.

Exhaust valves may be actuated by an exhaust valve actuation system 254, which may comprise an exhaust valve bridge 256, which is driven by a main exhaust rocker 258 receiving motion from a motion source (similar to cam 330 in FIG. 25). Exhaust valve bridge 256 may include a collapsing or deactivating mechanism 202 integrated therein, for deactivating the exhaust valve bridge 256. An auxiliary exhaust rocker 206, which may be driven by a cam (similar to cam 340 in FIG. 25), may provide auxiliary (braking) motion to one of the exhaust valves 252 through an exhaust valve bridge pin 262, which may move independent of the intake valve bridge 256. The engine braking rocker arm 206 may be a dedicated rocker arm provided for each cylinder in conjunction with the exhaust valve 252 such that the braking rocker arm 206 can provide compression-release valve actuation motions (via a bridge pin 262 in the illustrated example) to the exhaust valve. It is assumed throughout this disclosure that each braking rocker arm 206 may be associated with an auxiliary actuation motion source (not shown in FIG. 2 but represented in FIG. 25) capable of providing 2-stroke HPD engine braking valve actuation motions, i.e., two CR events and one or more additional air supplying events.

As will be recognized, when the intake valve bridge 216 and exhaust valve bridge 256 are not deactivated (i.e., when hydraulic fluid is not provided to the deactivation mechanisms 204 and 202, respectively), intake valve actuation system 214 and exhaust valve actuation system 254 may function, at least in part, as a main event motion system which provides main event motion to intake valves 210, 212 and exhaust valves 250, 252 to facilitate main event operation (i.e., a positive power mode) of an associated engine cylinder.

As will be readily recognized from the instant disclosure, control of the operation of the intake valve actuation system 214 and exhaust valve actuation system 254 may be implemented through one or more high-speed control solenoid valves and a network of hydraulic links or passages within the various valve train components to provide a hydraulic network or circuit through which the control valves may control the intake and exhaust valve actuation systems 214, 254.

An engine braking system may include an engine braking solenoid valve 270 which may be arranged and adapted to receive hydraulic fluid from a hydraulic supply passage 292 which may be provided in a valvetrain component, typically a rocker shaft (represented by dotted line box 290 in FIG. 2). Rocker shaft 290 may house a number of hydraulic passages to provide hydraulic links or circuits for operating various components of the valve actuation systems, as will be explained. Braking solenoid valve 270 may be a high-speed solenoid valve and may control (i.e., based on electronic signals from an engine control unit), via a braking solenoid valve manifold 271, the flow of hydraulic fluid in a braking hydraulic link or passage 294, which communicates with valvetrain components, such as the braking rocker arms 206, 206.1 and 206.2, and selectively operable hydraulic components thereon, to provide braking motion via bridge pin 262 to a braking exhaust valve 252, for example. The details of the hydraulic passages and control components that facilitate braking motion may be similar to those as described in U.S. Pat. No. 9,790,824. As will be recognized from the instant disclosure, the engine braking system may include control of engine braking in a number of cylinders, each having respective braking valvetrain components, such as braking rockers 206, 206.1 and 206.2, each of which communicates with the braking hydraulic passage 294 in the rocker shaft 290, and each receiving a braking control signal, in the form of hydraulic flow and/or pressure in braking hydraulic passage 294, the flow and/or pressure of which may be controlled by the braking solenoid valve 270.

Cylinder deactivation of one or more cylinders may be controlled with a cylinder deactivation system which may include a CDA solenoid valve 280 that is arranged and adapted receive hydraulic fluid from hydraulic supply passage 292 in the rocker shaft 290. CDA solenoid valve 280 may be a high-speed solenoid valve and may control (i.e., based on electronic signals from an engine control unit), via a CDA solenoid valve manifold 281, the flow of hydraulic fluid in a CDA hydraulic link or passage 296, which communicates with valvetrain components, such as the intake valve bridge 216 and exhaust valve bridge 256, and with the respective collapsing or deactivating mechanisms 204 and 202. Thus, CDA solenoid valve 280 may control activation and deactivation of the deactivating mechanisms 204 and 202. Similarly, the intake valve bridges 216.1 and 216.2, and exhaust valve bridges 256.1 and 256.2, and the respective collapsing or deactivation mechanisms thereon, 204.1, 204.2 and 202.1 and 202.2 (FIG. 3), may be similarly controlled.

According to aspects of the disclosure, the cylinder deactivation system may be selectively controlled with a blocking system. An example blocking system may include a blocking solenoid valve 240 which may be arranged and adapted to receive hydraulic fluid from the hydraulic supply passage 292. Blocking solenoid valve 240 may be a high-speed solenoid valve and may control the flow of hydraulic fluid in a blocking system hydraulic link or passage 298, which communicates with other valve components, such as spool valves 208, 208.1 and 208.2 which may be selectively actuated to block hydraulic flow in the hydraulic passages leading to the intake valve bridges 216, 216.1 and 216.2. According to one aspect of the disclosure, spool or blocking valve 208 may be integrated into the main event intake rocker 218 and adapted and arranged to selectively occlude the flow of hydraulic fluid within the intake rocker 218 that would otherwise deactivate the main event motion of valve bridge 216. As will be recognized from the instant disclosure, the blocking valve 208 may be implemented in other valve train components, such as on or within rocker shaft 290, or associated with other components, such as solenoid valves or manifolds. Example rocker arm configurations with integrated valves that are suitable for use to achieve the objectives of the blocking system are described below with reference to FIGS. 23 and 24. Through selective operation of the blocking valve 208, a secondary level of control is provided over operation of the deactivation mechanisms 204, 204.1 and 204.2 associated with the intake valves. That is, when the blocking valve 208 is controlled by the blocking solenoid valve 240 to permit flow of hydraulic fluid through the hydraulic passage controlling the deactivation mechanism 204, control of the deactivation mechanism 204 is dictated entirely by the CDA solenoid valve 280. On the other hand, when the blocking valve 208 is controlled by the blocking solenoid valve 240 to prevent flow of hydraulic fluid through the hydraulic passage controlling the deactivation mechanism 204, control of the deactivation mechanism 204 is unaffected by the CDA solenoid valve 280. As will be recognized, the blocking system may control blocking in multiple cylinders using the single blocking solenoid valve 206 with spool valves 208, 208.1 and 208.2, which control deactivation of intake bridges 216, 216.1 and 216.2, respectively. In this manner, the main event intake motion of intake valves may be preserved to achieve high power density braking when cylinder deactivation and braking actions are implemented in the system.

Those skilled in the art will appreciate that other mechanisms capable of deactivating intake and/or exhaust valve actuation motions are known in the art and the instant disclosure is not limited in this regard. In the context of the examples described in this disclosure, the deactivation mechanisms 202, 204 may be configured to have a "locked" state when hydraulic fluid is not supplied thereto such that valve actuation motions are conveyed through the deactivation mechanism to the corresponding engine valves. On the other hand, the deactivation mechanisms 202, 204 may have an "unlocked" configuration when hydraulic fluid is provided to thereto such that that valve actuation motions are not conveyed through the deactivation mechanism to the corresponding engine valves, i.e., the actuation motions are lost and the corresponding engine valves and associated motions are deactivated. However, those skilled in the art will appreciated that the example configurations may be modified such that control of the locked and unlocked states of the deactivation mechanisms 202, 204 can be reversed. In this latter case, providing hydraulic fluid (or hydraulic pressure/flow) to the deactivation mechanisms 202, 204 may cause the deactivation mechanisms 202, 204 to assume a locked state and vice versa.

It is noted that, for ease of illustration, each of FIGS. 2-5 illustrates components relevant to only three cylinders. However, in practice, it is understood that the illustrated components could be applied to a greater or lesser number of cylinders, or that the components described herein could be replicated to control more cylinders not shown in the FIGs. Thus, for example, while three cylinders are illustrated in FIGS. 2-5, a system for use with a so-called inline six-cylinder engine could be achieved by simply replicating the illustrated systems for a second set of three cylinders.

Throughout the figures of the instant disclosure, the convention has been adopted whereby hydraulic passages depicted by thick solid lines between hydraulic components may represent a state in which hydraulic passages depicted by such lines are charged with pressure and/or flow of hydraulic fluid (i.e., the lines represent an active hydraulic link, which may be considered an "on" signal communication via the hydraulic passages or links), whereas hydraulic passages depicted in outline form (i.e., parallel thin lines) between hydraulic components may represent a state in which hydraulic passages depicted by such lines are not charged with pressure and/or flow of hydraulic fluid (i.e., the lines represent an inactive hydraulic link, which may be considered an "off" signal communication via the hydraulic passages or links).

Thus, as shown in FIG. 2, CDA operation is illustrated in which the CDA solenoid 280 is energized and the HPD brake solenoid 270 and blocking solenoid 240 are not energized. In this state, the braking rocker arms 206 are controlled to lose any braking actuation motions applied thereto (i.e., no compression-release engine braking) and each blocking valve 208 is controlled to assume a default position (e.g., under spring bias) in which each corresponding hydraulic passage is maintained to permit hydraulic flow. Consequently, the energized CDA solenoid valve 280 permits hydraulic fluid to flow to each of the deactivation mechanisms 202, 204, thereby unlocking them such that all of the intake and exhaust valves are deactivated.

Figure 3:
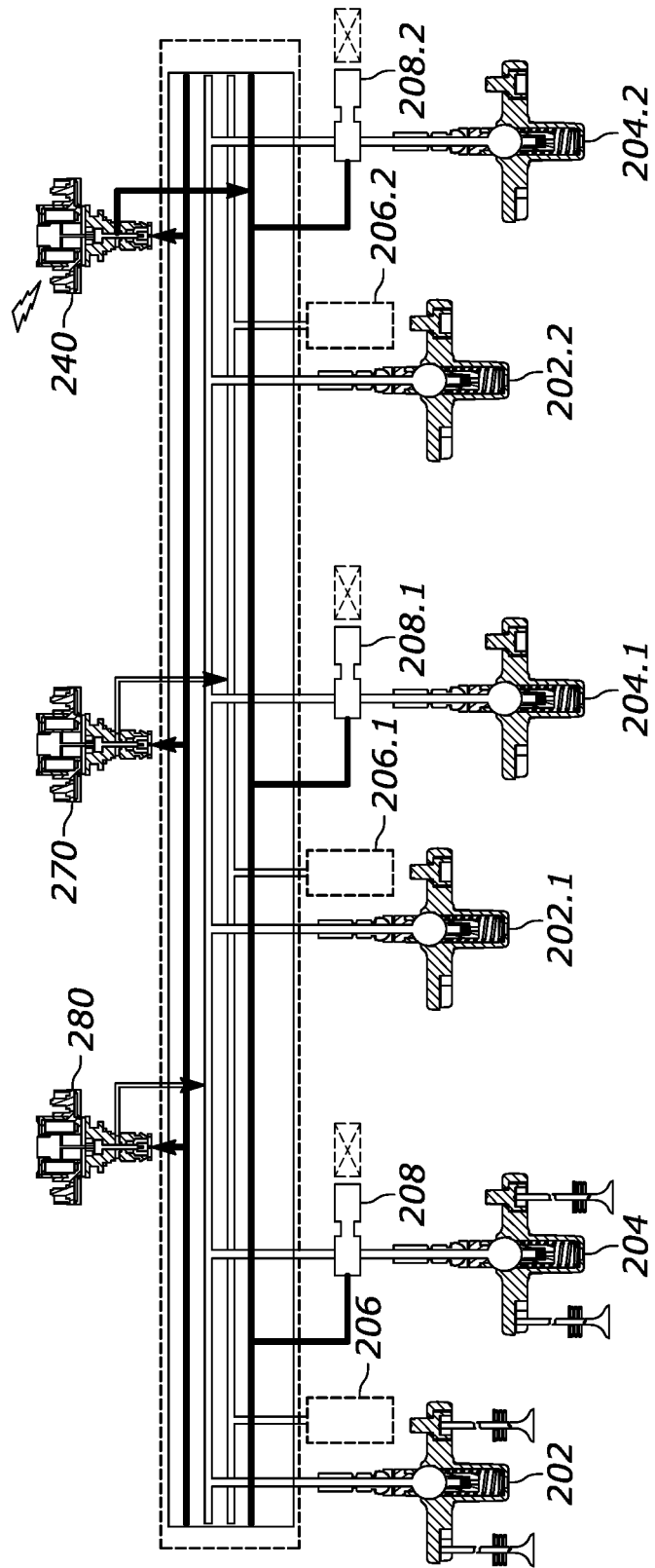
Figure 4:
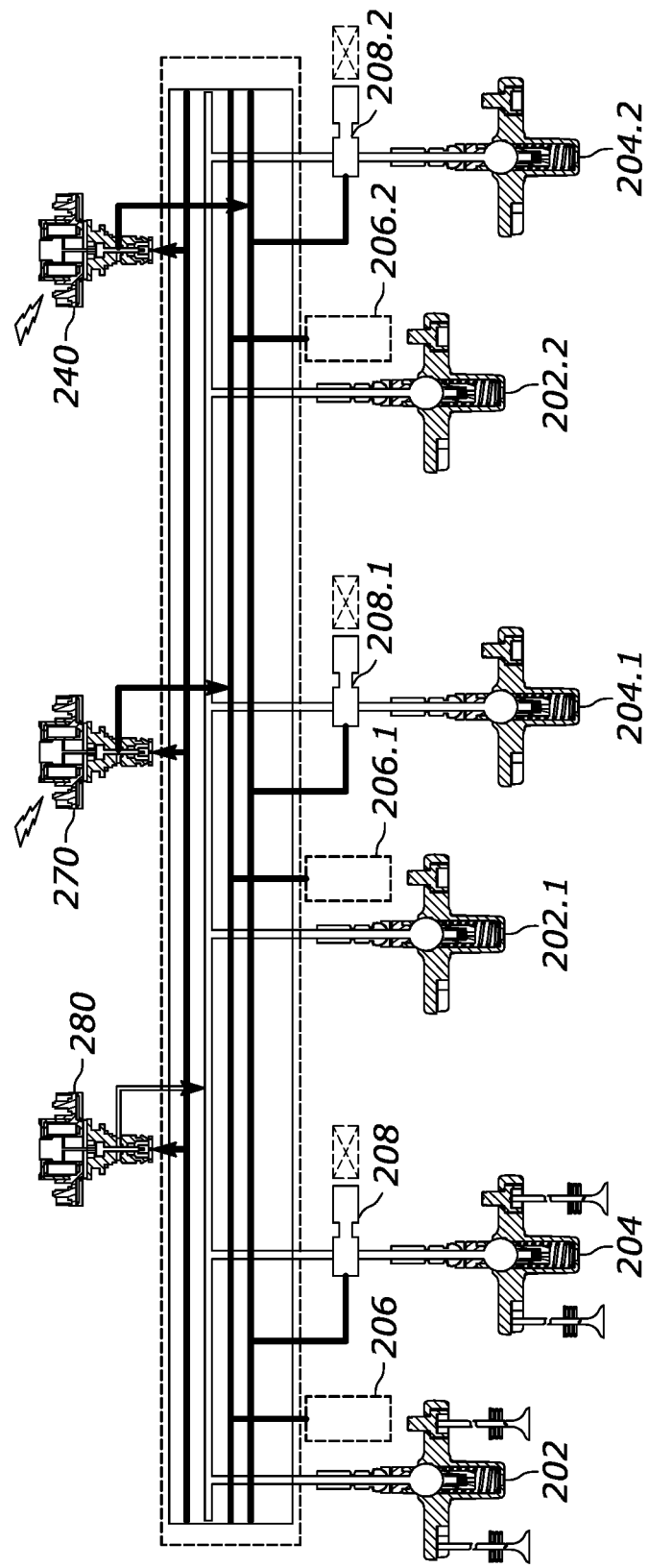
Figure 5:
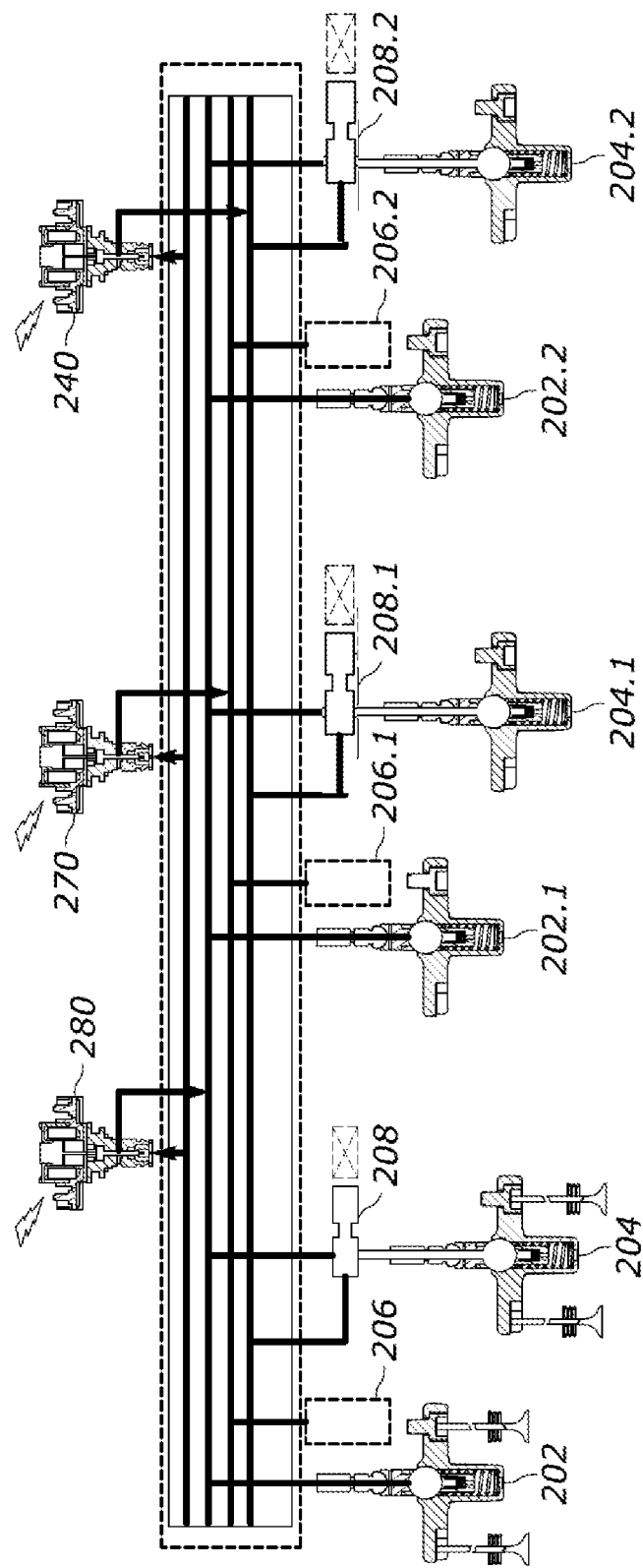

However, when CDA operation has not been enabled (i.e., the CDA solenoid valve 280 is not energized, thereby maintaining the deactivation mechanisms 202, 204 in their locked, motion-conveying state) and it is determined that an HPD operation (e.g., 1.5-stroke HPD) is desired, the actuators are sequenced as illustrated in FIGS. 3-5. Thus, as shown in FIG. 3, the blocking solenoid 240 is first energized such that the blocking valves 208 are all controlled to assume a blocking state, i.e., to block the hydraulic passage corresponding to the intake deactivation mechanism. Thereafter, as shown in FIG. 4, the HPD brake solenoid 270 is also energized such that the braking rocker arms 206 are activated to convey the auxiliary (HPD engine braking) valve actuation motions applied thereto. Then, as shown in FIG. 5, the CDA solenoid 280 is energized thereby deactivating main exhaust valve actuation motions (provided by a main exhaust valve actuation motions source, not shown). However, because the blocking pistons 208 are maintained in blocking states, operation of the CDA solenoid 280 has no effect on the intake deactivation mechanisms 204, thereby permitting the main intake valve events (provided by a main intake valve actuation motions source, not shown) to still be conveyed to the intake valves as required for 1.5-stroke HPD engine braking operation. Note that it is preferable to activate the braking rocker arms 206 prior to deactivation of the exhaust valves in order to avoid actuation of the intake valve (via, for example, an intake rocker arm) against potentially excessively high pressures in the cylinder. Note that the system illustrated in FIGS. 2-5 would require only three actuators to provide CDA and HPD engine braking operation for three cylinders (six actuators for six cylinders).

Figure 6:
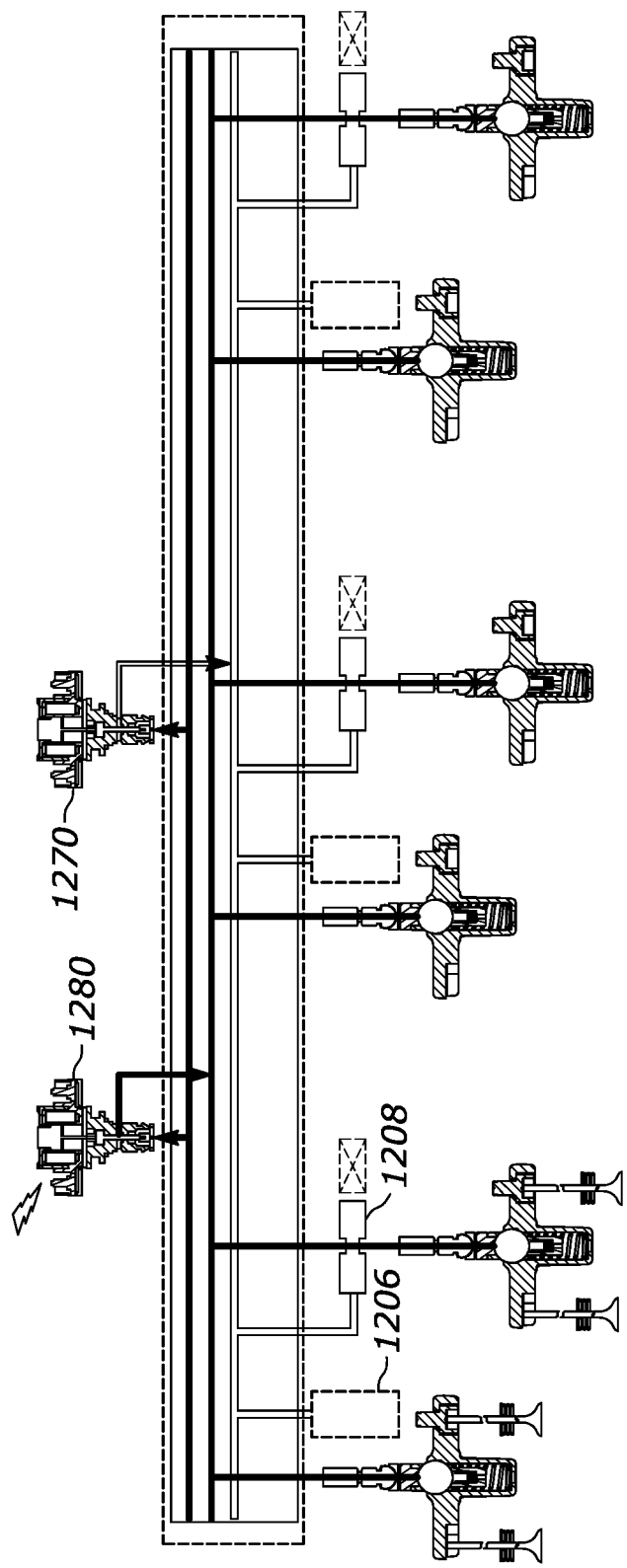
FIGS. 6-8 illustrate a system and actuator sequencing technique and method according to a second embodiment in accordance with the instant disclosure.
Figure 7:
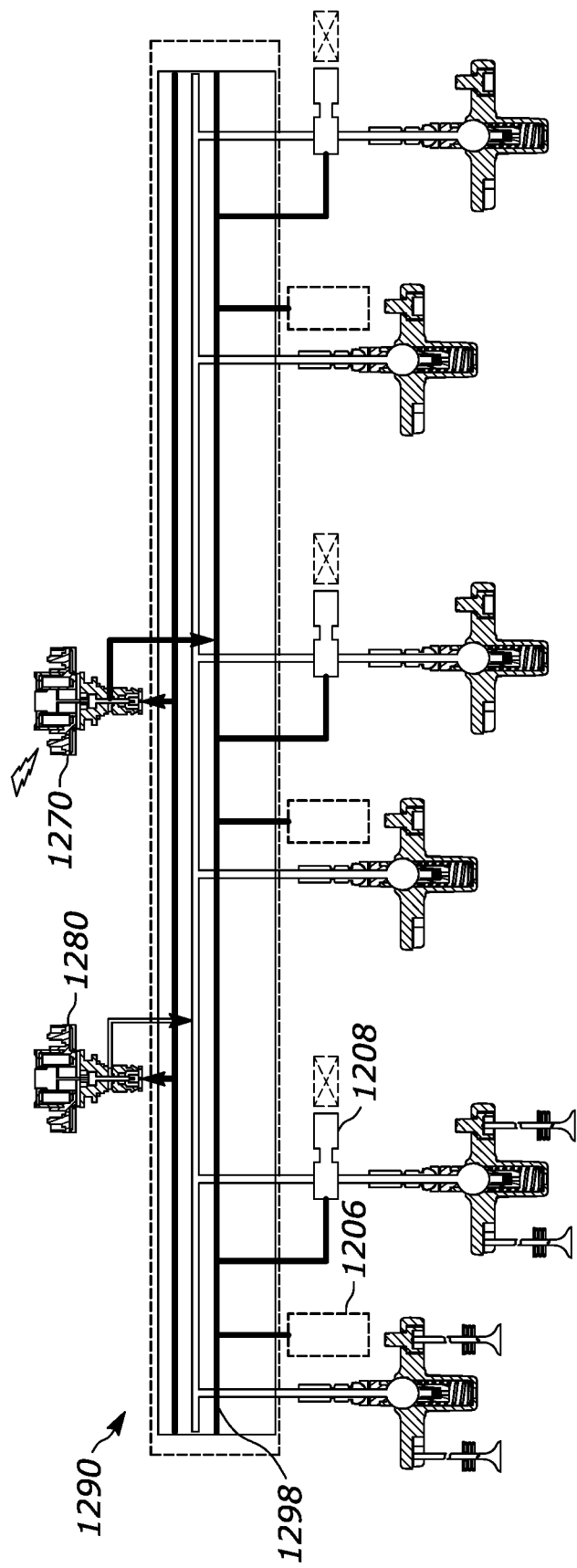
Figure 8:
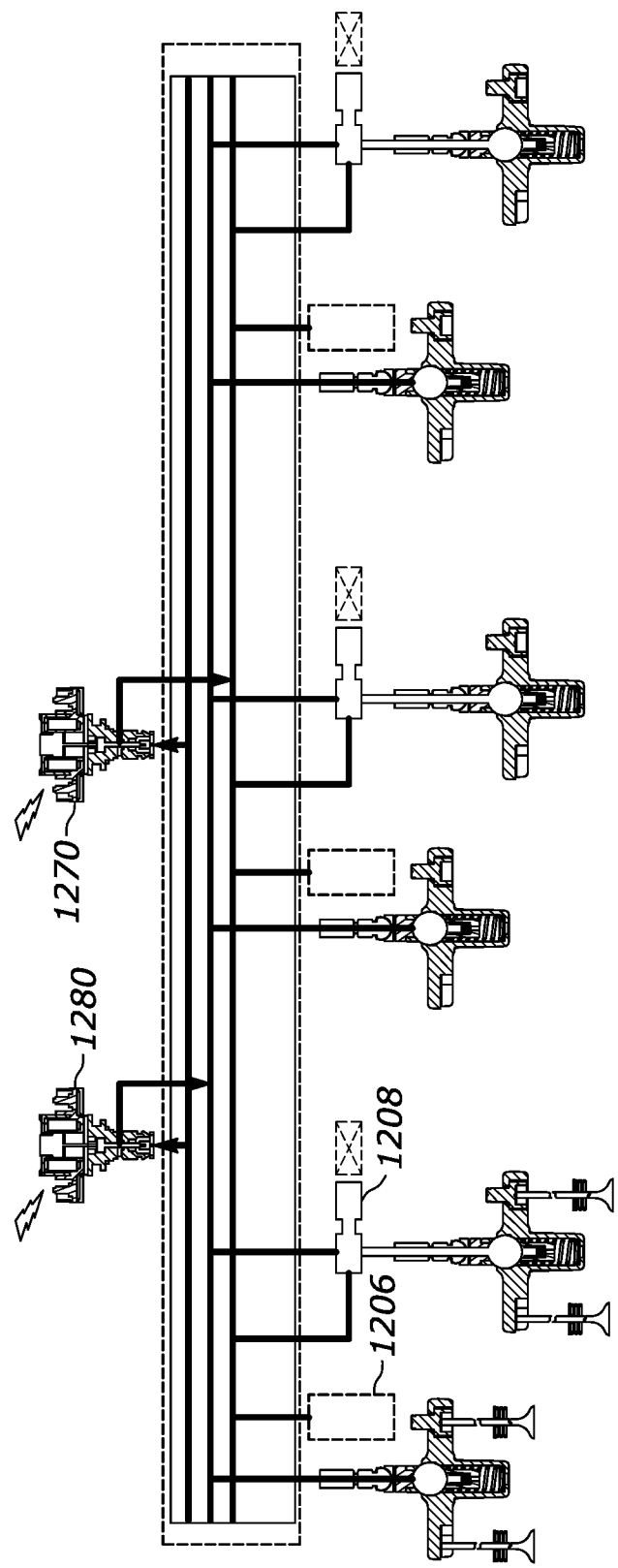

A second embodiment in accordance with the instant disclosure is illustrated with reference to FIGS. 6-8. Note that the system illustrated in FIGS. 6-8 is similar to the system illustrated in FIGS. 2-5. However, in this embodiment a single HPD brake solenoid 1270 is arranged and adapted to control both the braking rocker arms 1206 and the blocking valves 1208. As can be seen, the rocker shaft 1290 (FIG. 7) may be provided with a hydraulic passage or link 1298 (FIG. 7) that is common to, or shared by, the braking rocker arms 1206 and the blocking valves 1208. As shown in FIG. 6, CDA operation is provided when only the CDA solenoid 1280 is activated as before. When it is desired to provide HPD engine braking, first the HPD braking solenoid 1270 is energized as shown in FIG. 7, thereby substantially simultaneously charging the hydraulic passage 1298 associated with both the braking rocker arms 1206 and the blocking valves 1208. Such simultaneous operation may be acceptable in systems where activation of the braking rocker arms 1206 is relatively quick. Thereafter, as shown in FIG. 8, the CDA solenoid valve 1280 is energized such that main exhaust valve motions are once again deactivated, whereas operation of the blocking valves 1208 prevents deactivation of main intake valve events. As will be recognized, the actual sequencing of the blocking valves and HPD braking solenoid 1270 may also cause the braking action to occur before the blocking action, or in other sequences as may be appropriate for a given application.

Note that the system illustrated in FIGS. 6-8 would require only two actuators to provide CDA and HPD engine braking operation for three cylinders (four actuators for six cylinders). In this manner, in system in which braking activation is relatively quick, further cost savings in the from of few actuators may be realized. As will be recognized from the instant disclosure, for applications where independent CDA control is desired, the CDA quantity could be increased such that designated CDA circuits can be provided for each cylinder controlled.

A third embodiment in accordance with the instant disclosure is illustrated with reference to FIGS. 9-12. Note that the system illustrated in FIGS. 9-12 is similar to the system illustrated in FIGS. 6-8. However, separate hydraulic supply passages 2298 and 2294 are provided (for example, within the rocker shaft 2290, as known in the art) for the blocking valves 2208 and braking rocker arms 2206, which passages are fluidically coupled together by a connecting passage or link 2295 proximate an end (left end in FIG. 9) of the rocker shaft 2290 that is distant from the location of the HPD brake solenoid 2270, which supplies hydraulic fluid to those passages. In this manner, a hydraulic delay, as well as a logical sequence of activation, may be induced or facilitated between charging of the supply passage for the blocking valves 2208 and the supply passage for the braking rocker arms 2206. For example, in the illustrated configuration, the HPD brake solenoid is configured to charge the supply passage 2298 for the blocking valves 2208 at one end thereof. At the other end of the supply passage 2298 for the blocking valves 2208, a connection or link 2295 is provided to the supply passage 2294 for the braking rocker arms 2206. Consequently, the supply passage for the braking rocker arms 2206 will be charged with hydraulic fluid only after the supply passage for the braking blocking valves 2208 is charged.

Figure 9:
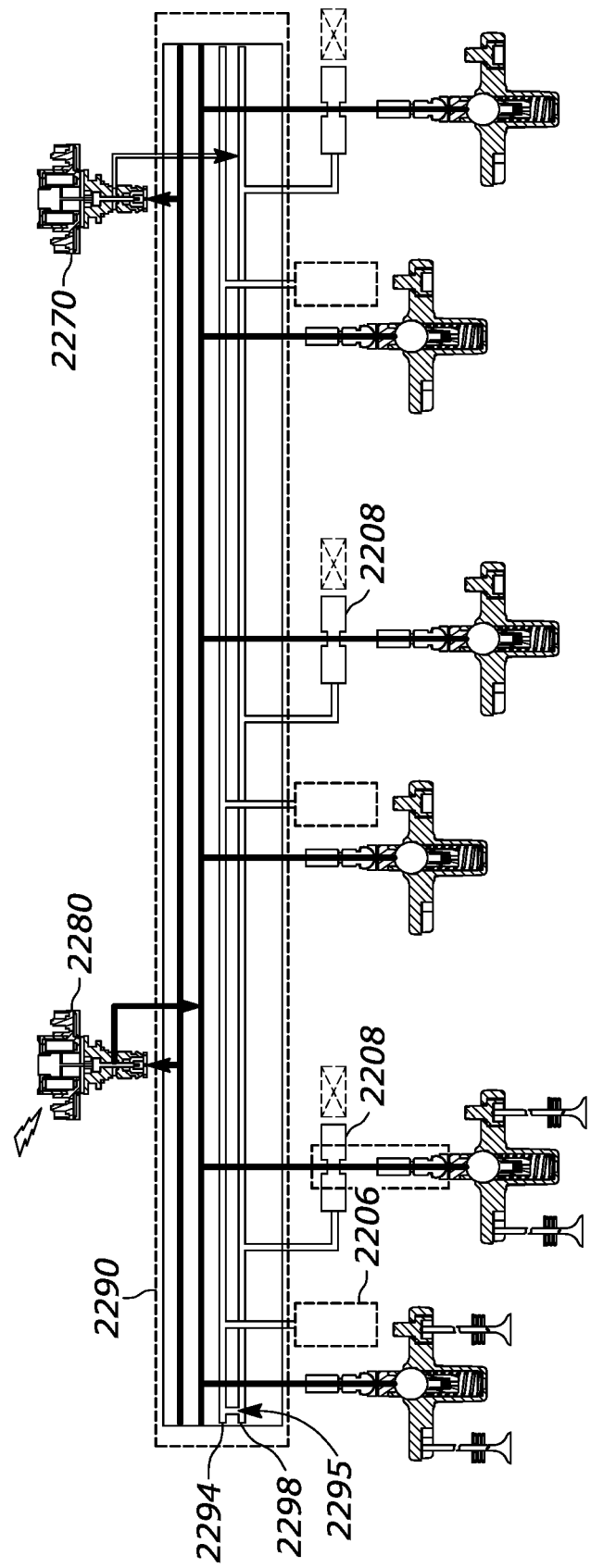
FIGS. 9-12 illustrate a system and actuator sequencing technique and method according to a third embodiment in accordance with the instant disclosure.
Figure 10:
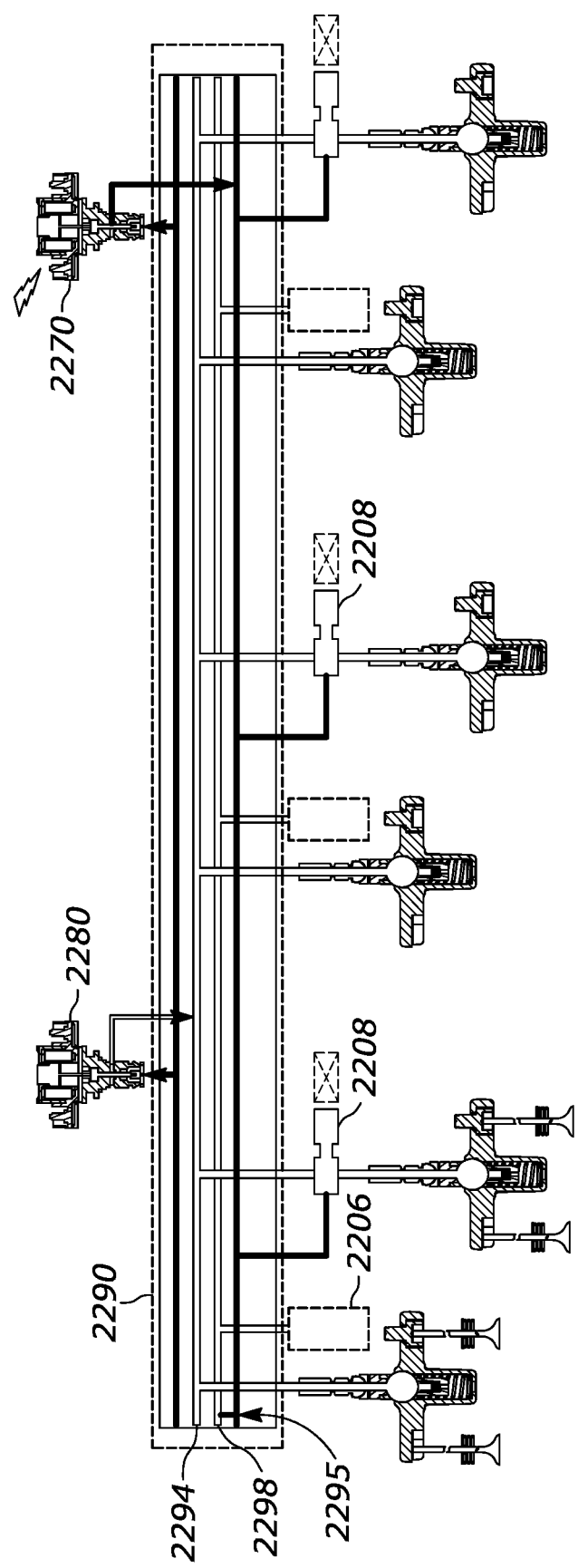
Figure 11:
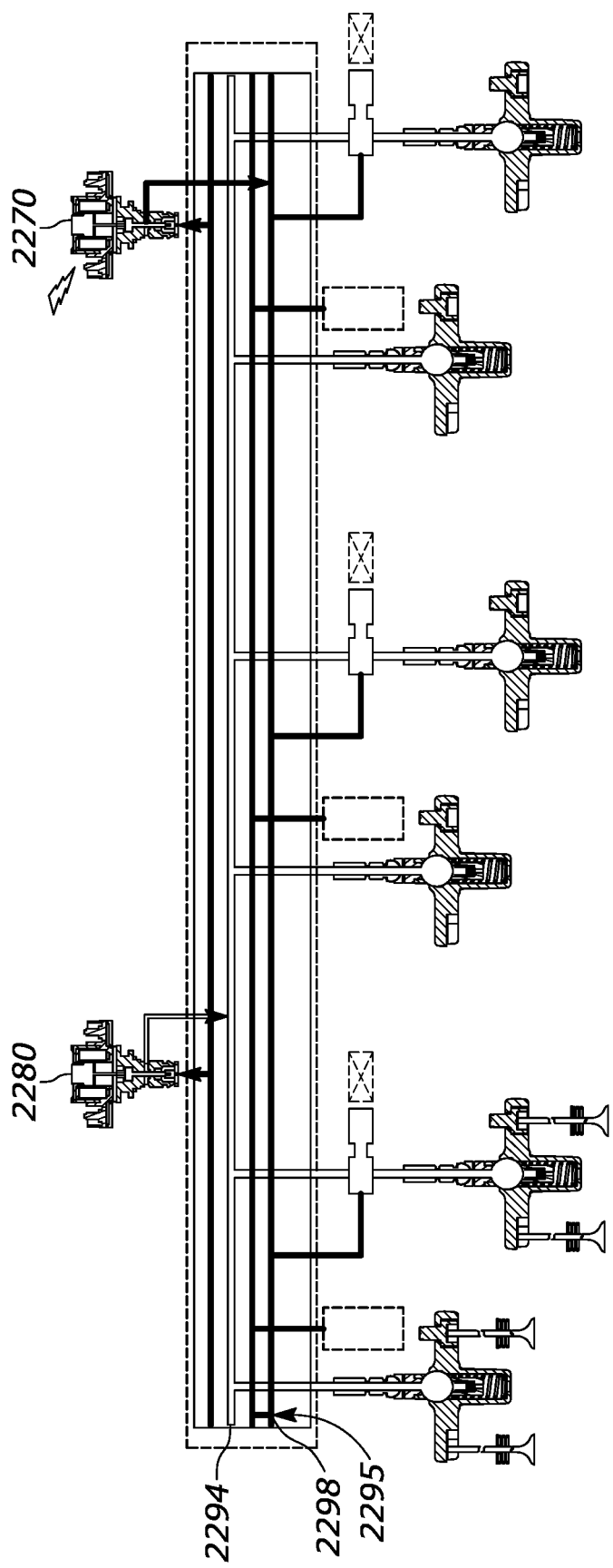
Figure 12:
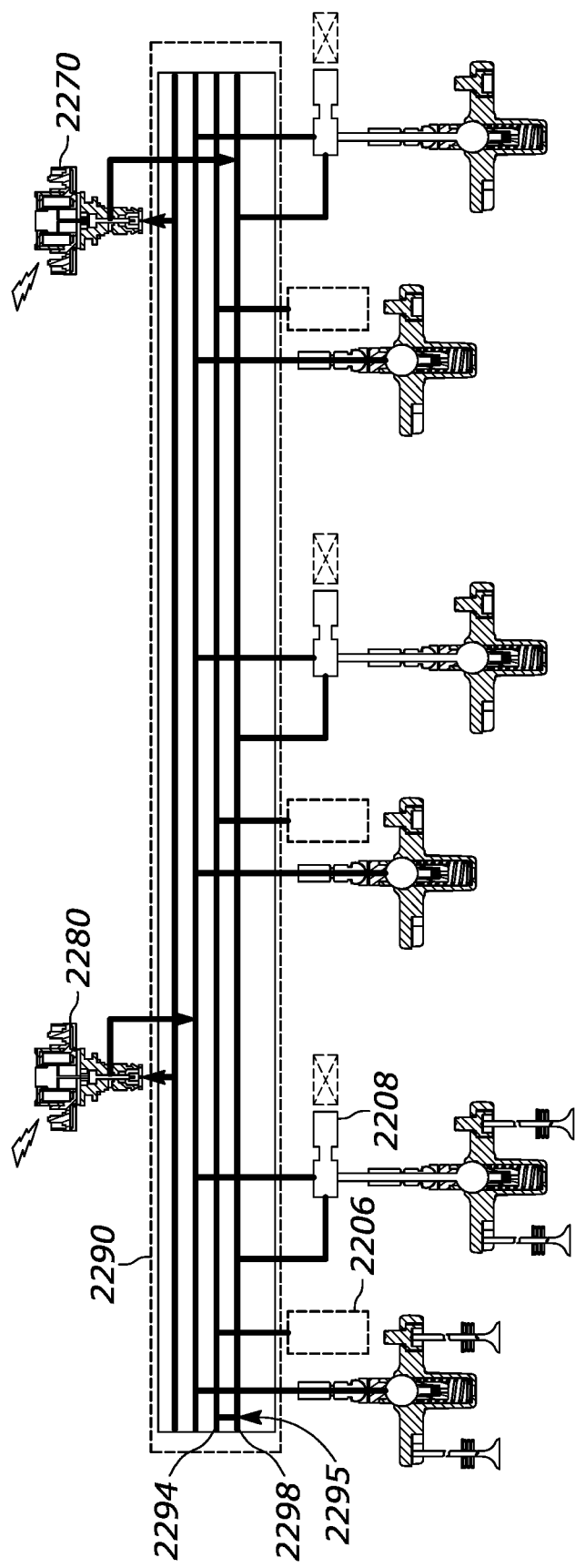

Thus, as shown in FIG. 9, CDA operation is provided when only the CDA solenoid 2280 is activated as before. When it is desired to provide HPD engine braking, only the HPD brake solenoid 2270 is energized as shown in FIG. 10, such the hydraulic passages 2298 associated with the blocking valves 2208 are charged first. Thereafter, as shown in FIG. 11, the connection 2295 between the hydraulic supply passages permits further charging of the hydraulic passages 2298 and associated with the braking rocker arms 2206, thereby implementing a delay between the time when the blocking valves 2208 (FIG. 10) are activated and the time with the braking rocker arms 2206 are activated. Finally, as shown in FIG. 12, the CDA solenoid 2280 is energized such that main exhaust valve motions are once again deactivated, whereas operation of the block valves 2208 prevents deactivation of main intake valve events. As will be recognized from the instant disclosure, the system illustrated in FIGS. 9-12 would require only two actuators to provide CDA and HPD engine braking operation for three cylinders (four actuators for six cylinders), albeit at the cost of delaying activation of the braking rocker arms 2206.

Figure 14:
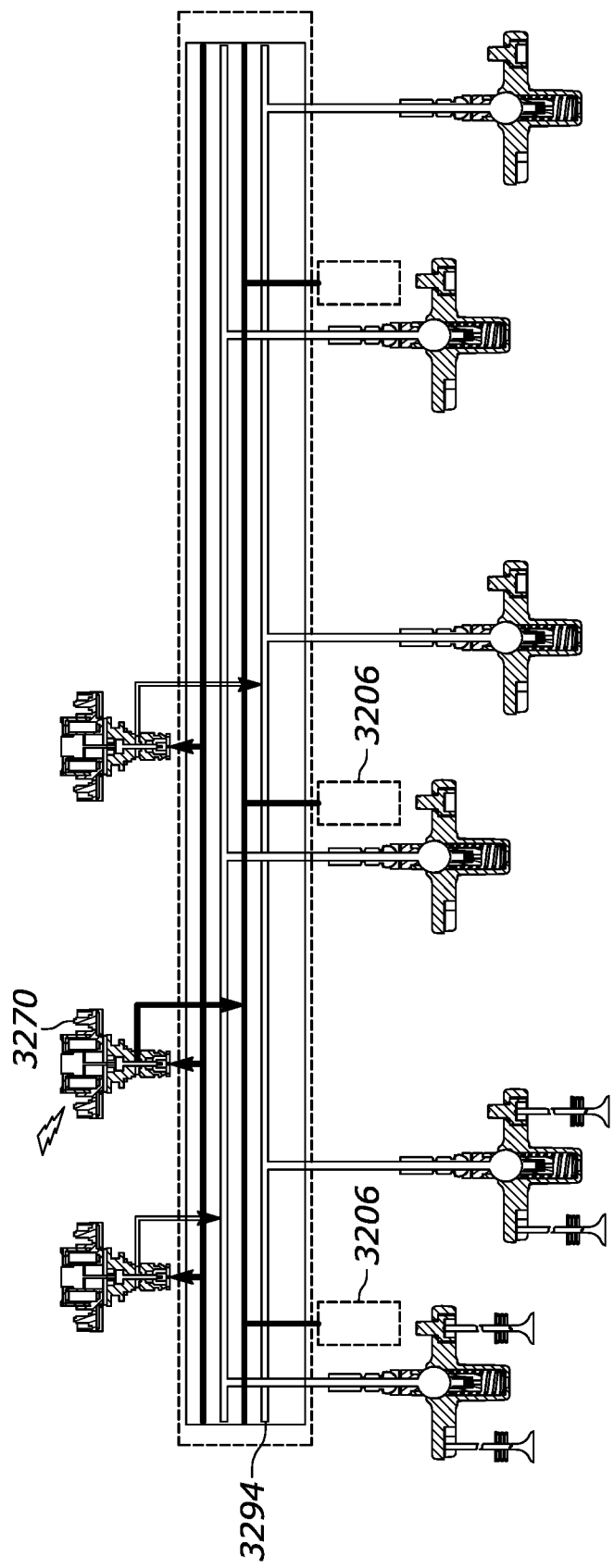
Figure 15:
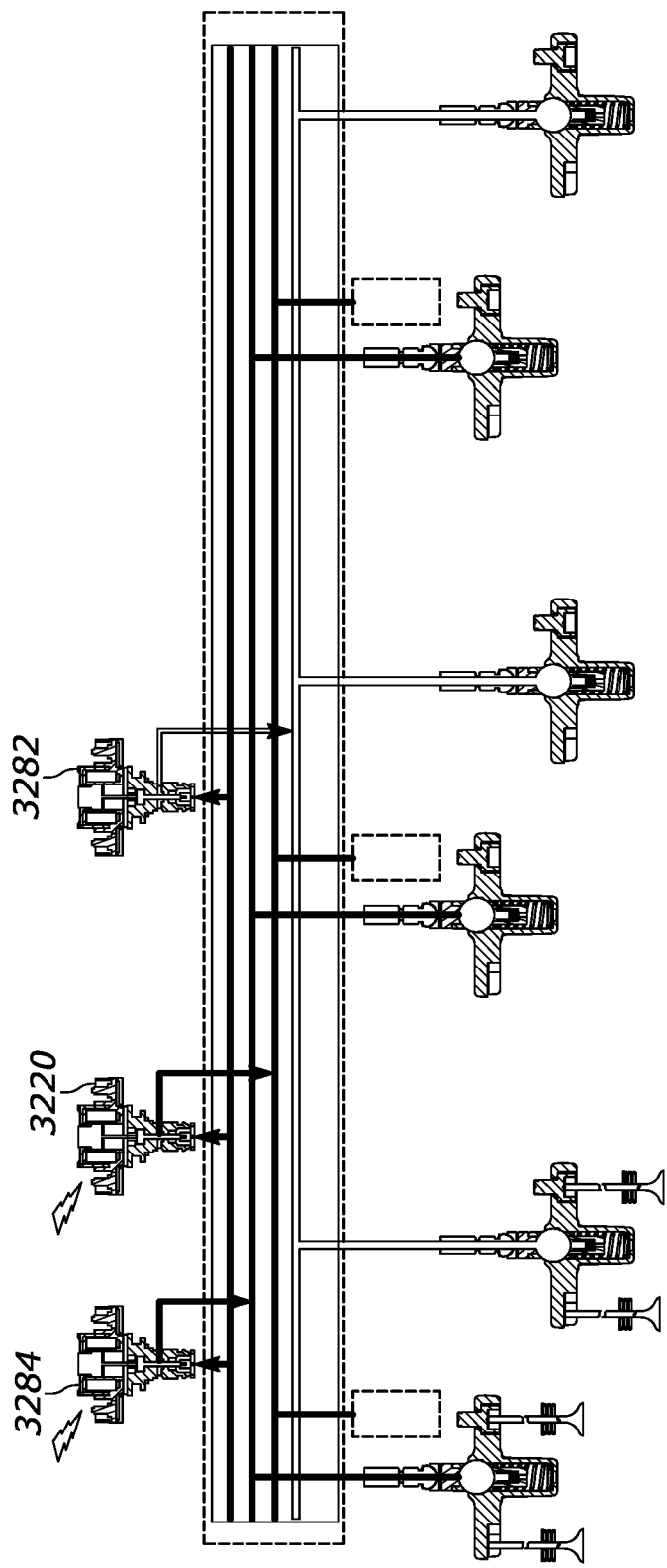

A fourth embodiment in accordance with the instant disclosure is illustrated with reference to FIGS. 13-15. In this embodiment, the single CDA solenoid valve of previous embodiments may be replaced with two actuators or control valves, one each for separate control of the exhaust deactivation mechanisms 3202 and the intake deactivation mechanisms 3204. More specifically, an exhaust deactivation solenoid 3284 may control activation/deactivation of the exhaust deactivation mechanisms 3202 and an intake deactivation solenoid 3282 may control activation/deactivation of the intake deactivation mechanisms 3204. As further shown, a single HPD brake solenoid 3270 may be provided for control of the braking rocker arms 3206 as before. By providing separate control of the exhaust deactivation mechanisms 3202 and the intake deactivation mechanisms 3204, it is possible to provide greater control when it is desirable to promote trapped gasses or, oppositely, a vacuum in deactivated cylinders, as known in the art. Furthermore, because of the separate control provided for the intake and exhaust mechanisms, no blocking valves are required in this embodiment.

Figure 13:
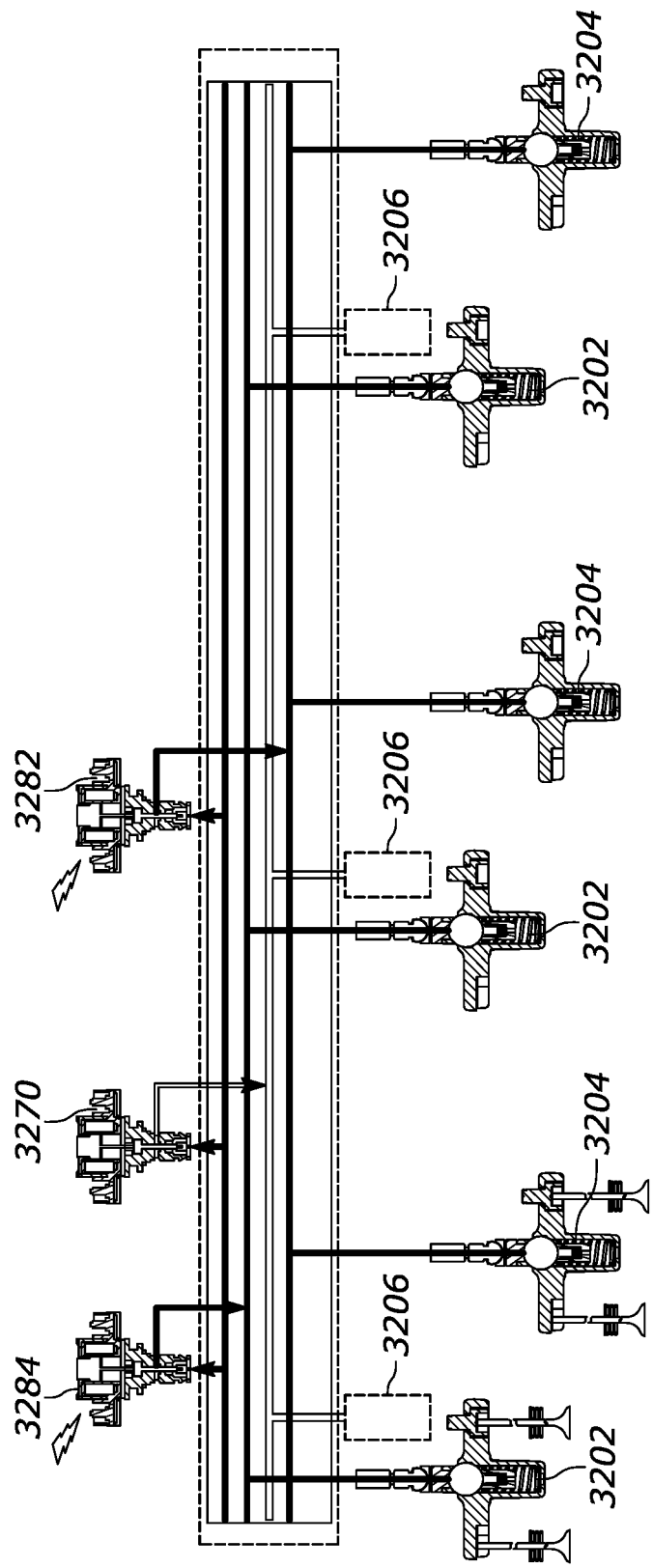
FIGS. 13-15 illustrate a system and actuator sequencing technique and method according to a fourth embodiment in accordance with the instant disclosure.

Thus, as shown in FIG. 13, CDA operation is provided when both the exhaust deactivation solenoid 3284 and the intake deactivation solenoid 3282 are energized, thereby deactivating both the exhaust and intake main valve events. As noted, the particular sequencing of the exhaust deactivation solenoid 3284 and the intake deactivation solenoid 3282 may be controlled in order to promote the presence of trapped gasses or vacuums in the cylinders, as known in the art. When it is desired to provide HPD engine braking, the HPD brake solenoid 3270 is energized first as shown in FIG. 14 such the hydraulic passages 3294 associated with the braking rocker arms 3206 are charged first. Thereafter, as shown in FIG. 15, the exhaust deactivation solenoid 3284 is also energized such that main exhaust valve motions are once again deactivated, whereas the intake deactivation solenoid 3282 remains unenergized, which thereby prevents deactivation of main intake valve events. As will be recognized from the instant disclosure, that the system illustrated in FIGS. 13-15 would require only three actuators to provide CDA and HPD engine braking operation for three cylinders (six actuators for six cylinders), which providing flexibility for controlling the gas/vacuum state of the cylinders during CDA operation.

A fifth embodiment in accordance with the instant disclosure is illustrated with reference to FIGS. 16-19. In this embodiment, the single CDA solenoid valve may be replaced with separate CDA actuators uniquely corresponding to the intake and exhaust valves of each cylinder. Thus, as shown, a first CDA solenoid valve 4282 is provided for a first cylinder, a second CDA solenoid valve 4284 is provided for a second cylinder and a third CDA solenoid valve 4286 is provided for a third cylinder. As shown, each of these CDA solenoid valves is arranged and adapted, in combination with hydraulic passages in the rocker shaft 4290 to control operation of both the respective exhaust and intake deactivation mechanisms 4202, 4204 for the corresponding cylinder. As further shown, a single HPD brake solenoid 4240 is provided for control of the braking rocker arms 206 and a single blocking solenoid valve 4240 is provided for control of the blocking valves 4208.

Figure 16:
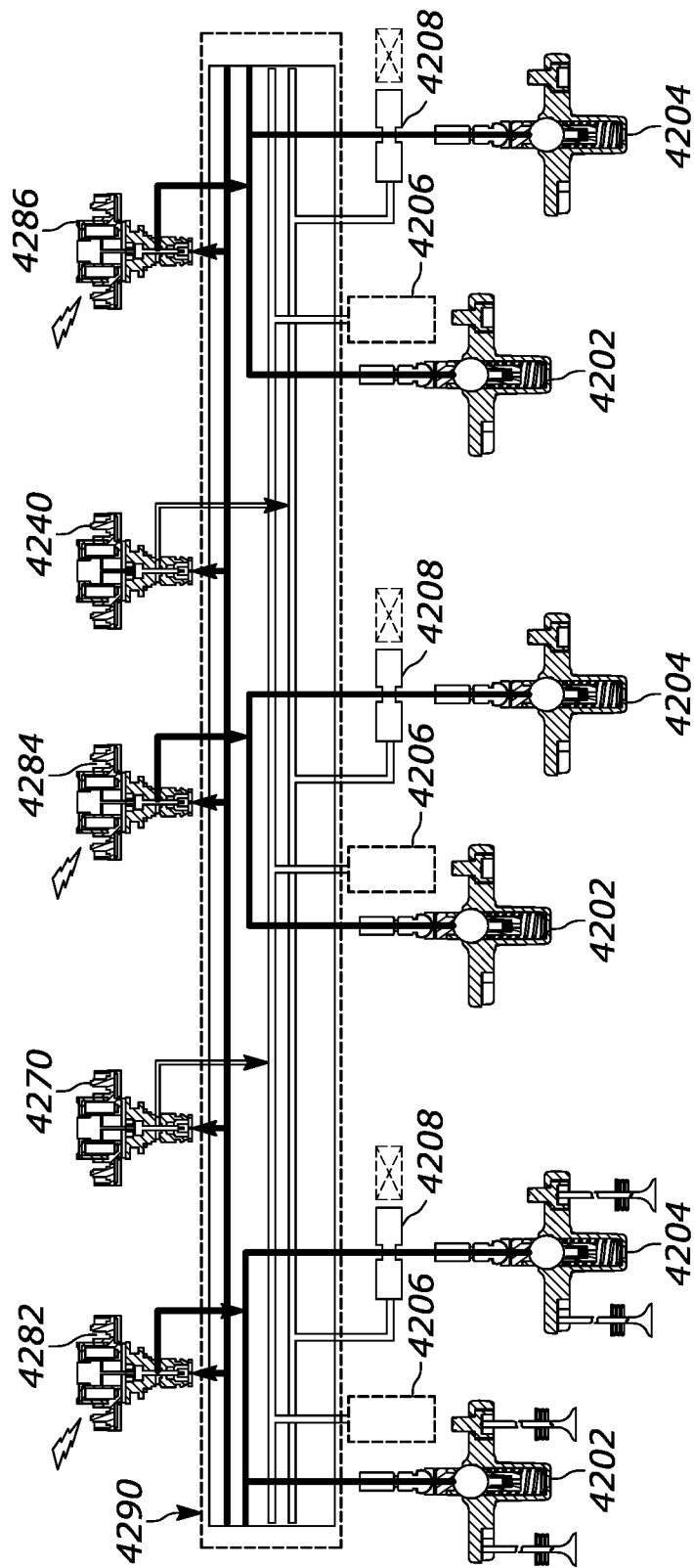
FIGS. 16-19 illustrate a system and actuator sequencing technique and method according to a fifth embodiment in accordance with the instant disclosure.

Thus, as shown in FIG. 16, CDA operation is provided when the CDA solenoid valves 4282, 4284 and 4286 are energized, and the HPD brake solenoid 4270 and the blocking solenoid valve 4240 are not energized. In this state, the braking rocker arms 4206 are controlled to lose any braking actuation motions applied thereto (i.e., no compression-release engine braking) and each blocking valve 4208 is controlled to assume a default position (e.g., under spring bias) in which each corresponding hydraulic passage is maintained to permit hydraulic flow. Consequently, the energized CDA solenoids 4282, 4284 and 4286 permit hydraulic fluid to flow to each of the deactivation mechanisms 4202, 4204 thereby unlocking them such that all of the intake and exhaust valves are deactivated. It is noted that, while FIG. 16 illustrates all three depicted CDA solenoids being simultaneously activated, this is not a requirement. That is, some number of CDA solenoids less than all of them may be energized to provide a lesser level of cylinder deactivation. In this manner, levels of cylinders deactivation may be dynamically controlled (i.e., via signals from an electronic control unit).

Figure 17:
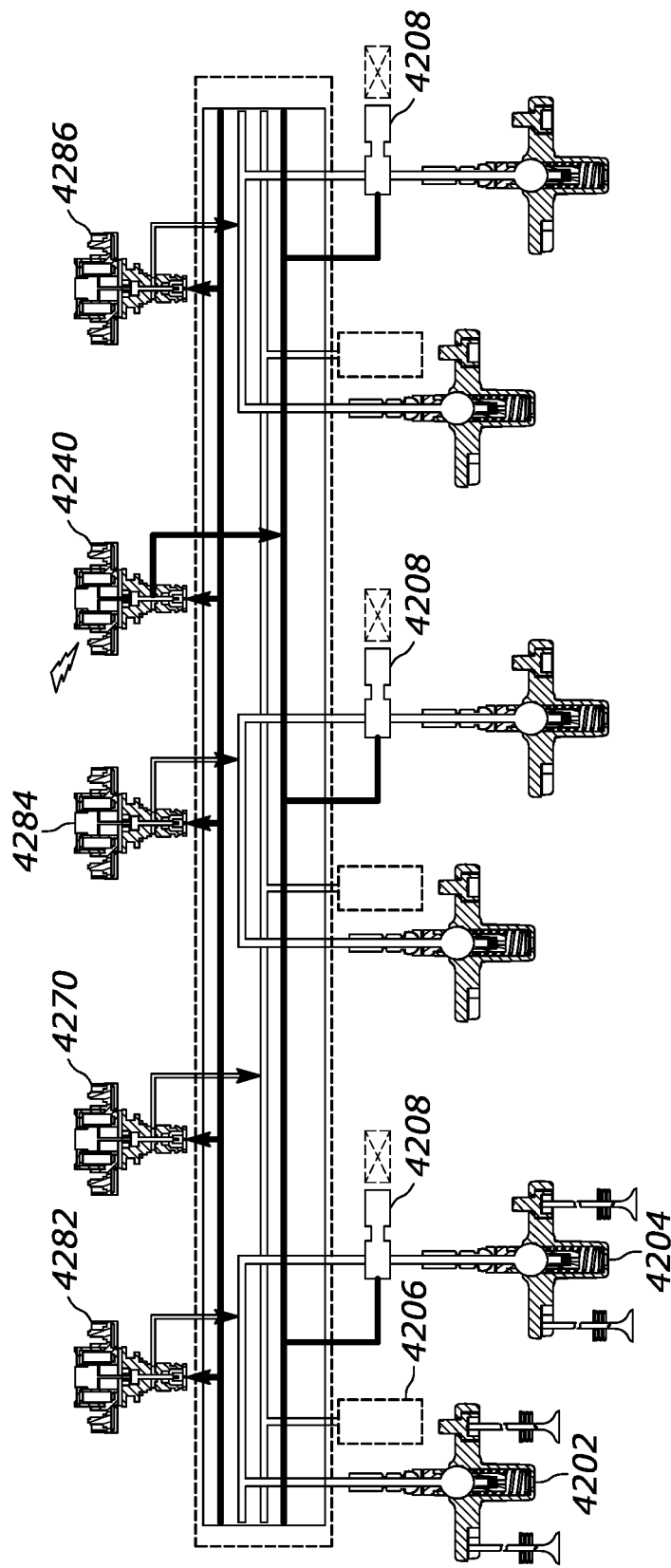
Figure 18:
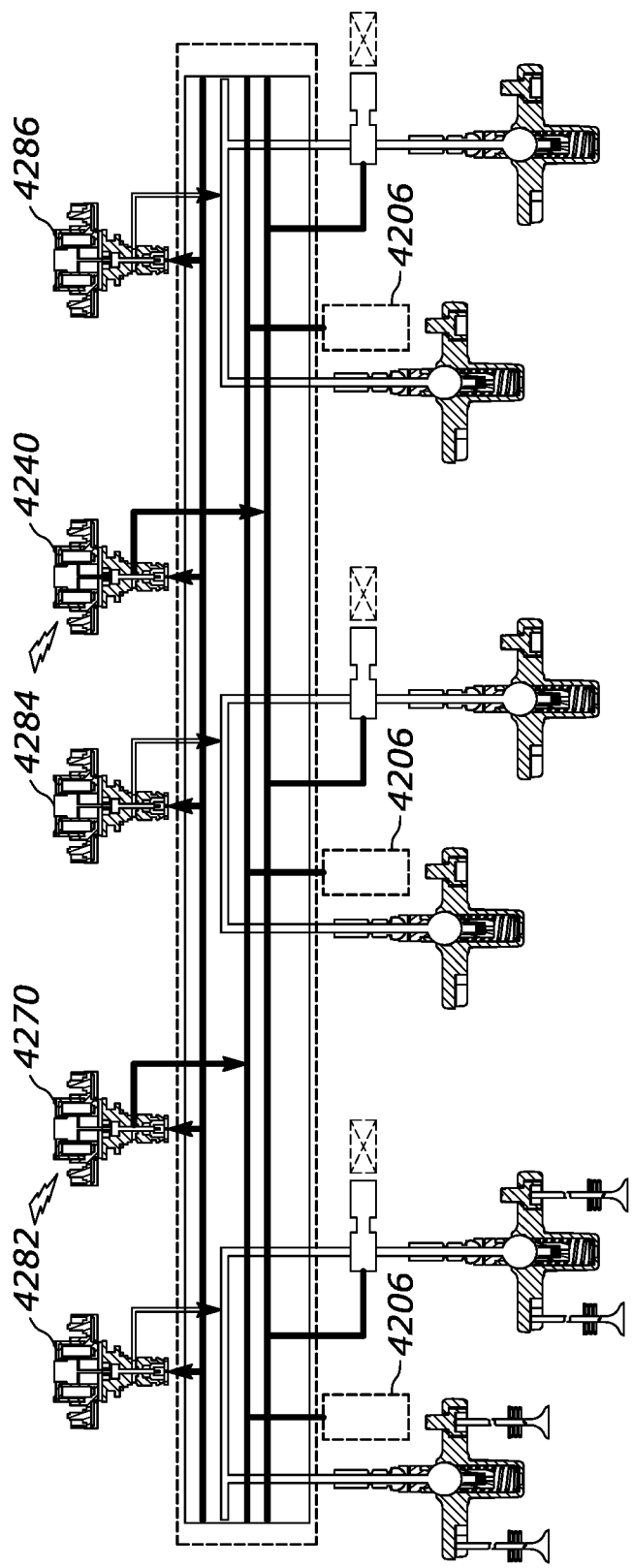
Figure 19:
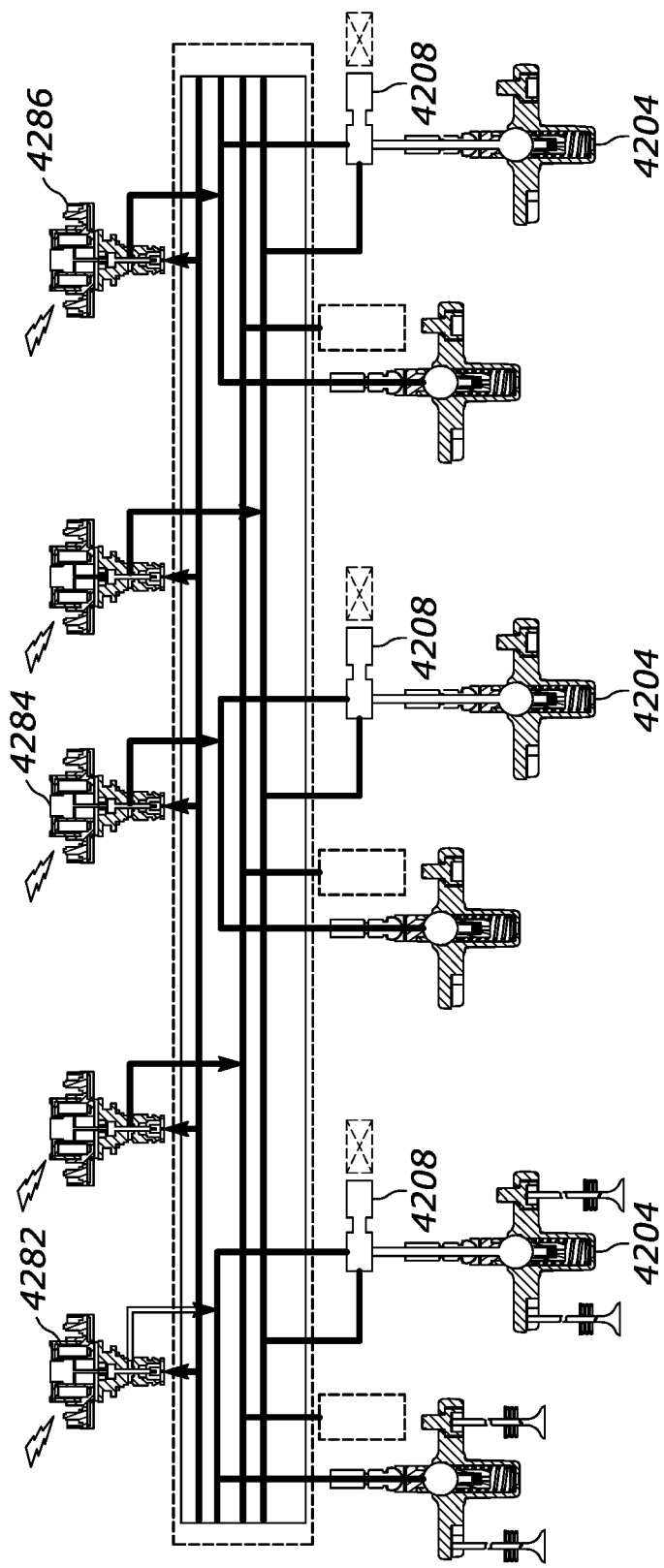

However, when CDA operation has not been enabled (i.e., the CDA Solenoids are not energized, thereby maintaining the deactivation mechanisms 4202, 4204 is their locked, motion-conveying state) and it is determined that HPD operation is desired, the actuators are sequenced as illustrated in FIGS. 17-19. Thus, as shown in FIG. 17, the blocking solenoid valve 4240 is first energized such that the blocking valves 4208 are all controlled to assume the blocking state. Thereafter, as shown in FIG. 18, the HPD brake solenoid is also energized such that the braking rocker arms 4206 are activated to convey the auxiliary (HPD engine braking) valve actuation motions applied thereto. Then, as shown in FIG. 19, the CDA solenoids 4282, 4284 and 4286 are energized thereby deactivating main exhaust valve actuation motions. However, because the blocking pistons 4208 (FIG. 17) are maintained in blocking states, operation of the CDA solenoids has no effect on the intake deactivation mechanisms 4204, thereby permitting the main intake valve events to still be conveyed to the intake valves as required for 1.5-stroke HPD engine braking operation. The braking and blocking actions can be substantially simultaneous, so long as both actions precede the time when there is an opportunity to deactivate the deactivation mechanisms. As will be recognized from the instant disclosure, the system illustrated in FIGS. 16-19 would require only five actuators to provide CDA and HPD engine braking operation for three cylinders (ten actuators for six cylinders). Such separate CDA actuators can provide various benefits. For example, individual CDA control can allow for operation with a different firing pattern that may be beneficial for noise/vibration/harshness (NVH) reasons, and also potentially allow operation to higher torque levels than the 100 or 50% CDA versions.

A sixth embodiment in accordance with the instant disclosure is illustrated with reference to FIGS. 20-22. This sixth embodiment combines aspects of the second embodiment shown in FIGS. 6-9 with the aspects of the fifth embodiment shown in FIGS. 16-19. In particular, as in the second embodiment, a single HPD brake solenoid 5270 is provided to control both the braking rocker arms 5206 and the blocking valves 5208, whereas separate actuators, CDA solenoid valves 5282, 5284 and 5286 are provided for controlling CDA on a per cylinder basis, in keeping with the fifth embodiment.

Figure 20:
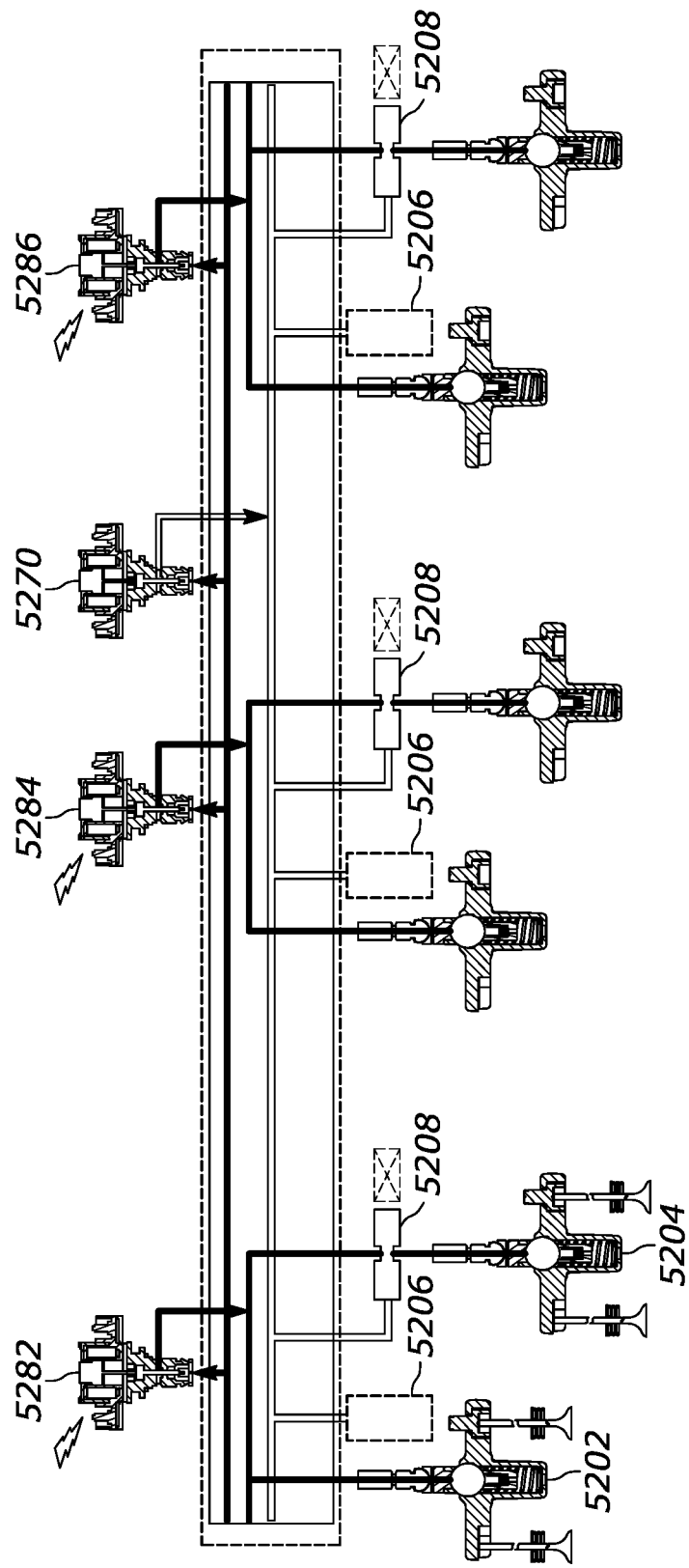
FIGS. 20-22 illustrate a system and actuator sequencing technique and method according to a sixth embodiment in accordance with the instant disclosure.

Thus, as shown in FIG. 20, CDA operation is provided when the CDA solenoids 5282, 5284 and 5286 are energized, and the HPD brake solenoid 5270 is not energized. In this state, once again, the braking rocker arms 5206 are controlled to lose any braking actuation motions applied thereto and each blocking valve 5208 is controlled to assume a default position in which each corresponding hydraulic passage is maintained to permit hydraulic flow. Consequently, the energized solenoids 5282, 5284 and 5286 permit hydraulic fluid to flow to each of the deactivation mechanisms 5202, 5204 thereby unlocking them such that all of the intake and exhaust valves are deactivated. Once again, as described above, it is noted that not all CDA solenoids need be energized at the same time during CDA operation in order to provide dynamic levels of CDA.

Figure 21:
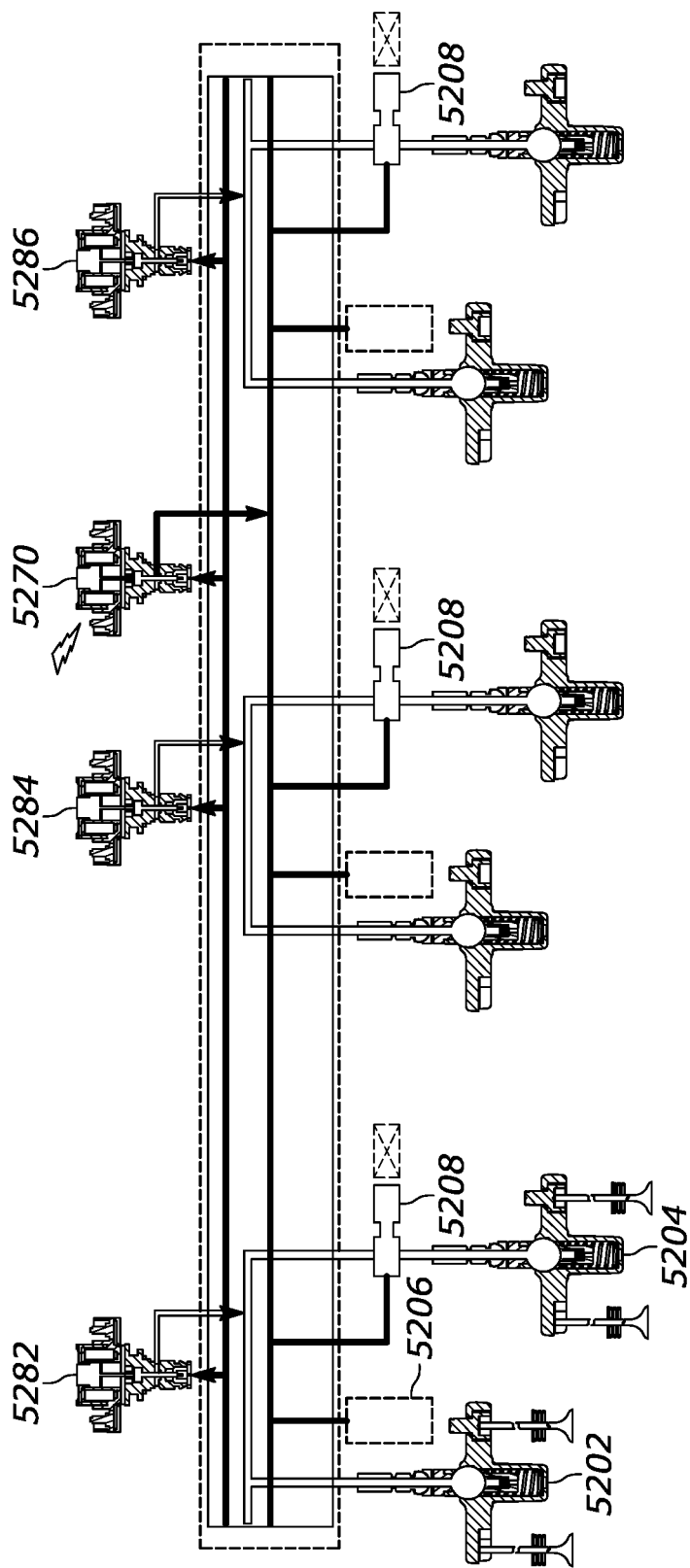
Figure 22:
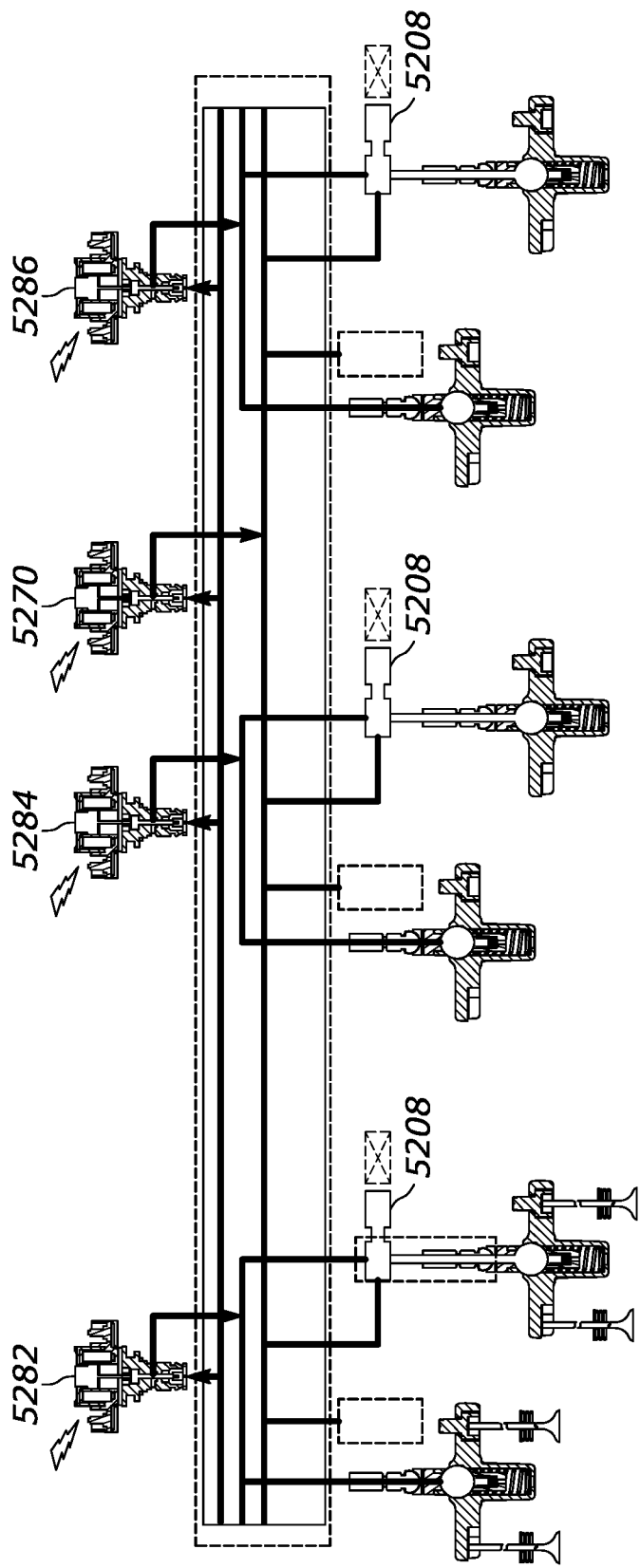

When it is desired to provide HPD engine braking, only the HPD brake solenoid 5270 is energized as shown in FIG. 21, thereby substantially simultaneously charging the hydraulic passages associated with both the braking rocker arms 5206 and the blocking valves 5208. Then, as shown in FIG. 22, the CDA solenoids 5282, 5284 and 5286 are energized, thereby deactivating main exhaust valve actuation motions. However, because the blocking pistons 5208 are maintained in blocking states, operation of the CDA solenoids 5282, 5284 and 5286 has no effect on the intake deactivation mechanisms 5204, thereby permitting the main intake valve events to still be conveyed to the intake valves as required for 1.5-stroke HPD engine braking operation.

Figure 23:
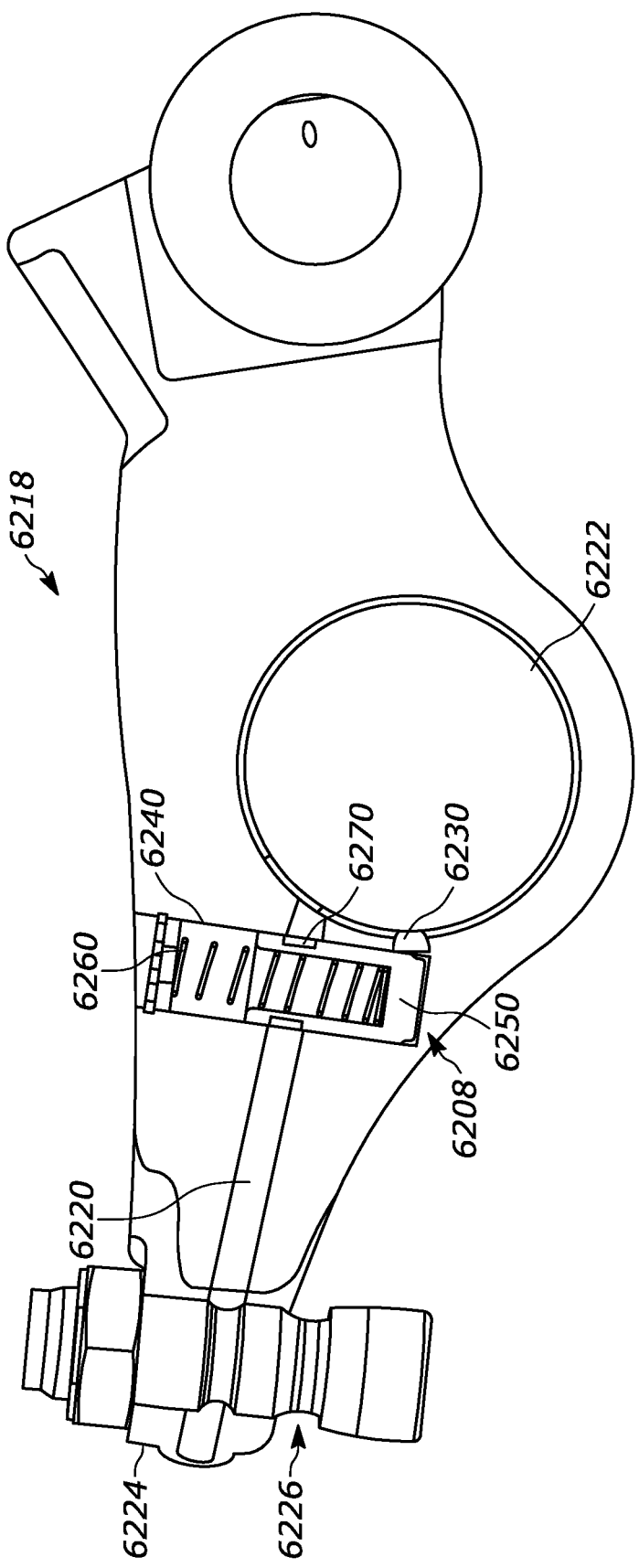
FIGS. 23 and 24 illustrate operation of an example of a spool cylinder implementation in a rocker arm that may be used to implement the first through sixth embodiments.
Figure 24:
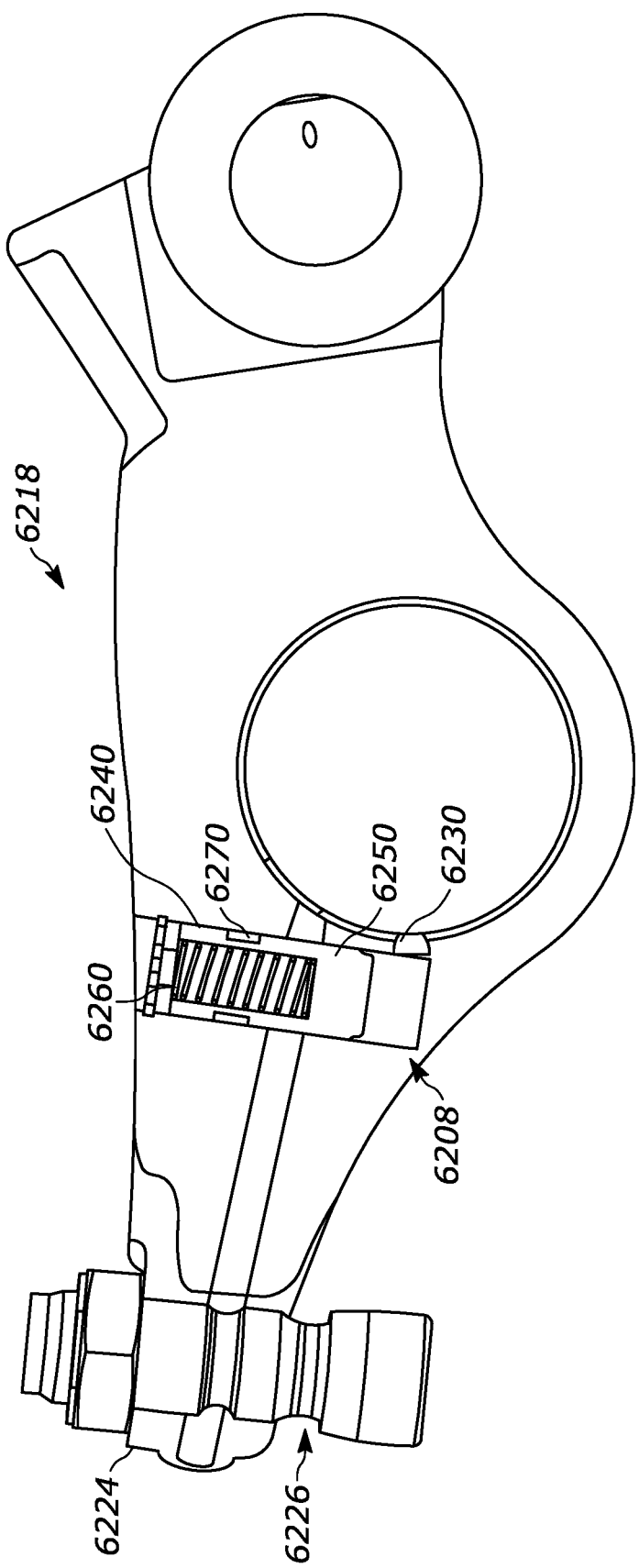

In all of the first through third, fifth and sixth embodiments described above, a blocking valve (i.e., 208 in FIGS. 2-5) is illustrated in a hydraulic passage supplying the intake deactivation mechanisms (i.e., 204 in FIGS. 2-5). As noted, such blocking valves may be disposed in any of a variety of locations along hydraulic passages supplying hydraulic fluid to the intake deactivation mechanisms. An example implementation of a blocking valve configuration is illustrated in FIGS. 23 and 24, in which a blocking valve in the form of a spring biased spool valve is deployed in a rocker arm 6218 and arranged to selectively block a hydraulic passage 6220 therein. As will be recognized from the instant disclosure, passage 6220 may be arranged to convey hydraulic fluid from a rocker shaft (not shown in FIGS. 23 and 24, but such would be located in the rocker arm journal 6222). Passage 6220 conveys hydraulic fluid through a rocker arm nose 6224 and through an internal passage in an e-foot 6226, which acts upon a valve bridge (not shown), which in turn may have a hydraulic passage to a deactivation mechanism therein, as explained above with reference to FIG. 25.

As shown the, rocker arm 6218 may include two hydraulic passages—a CDA passage 6220 for the supply of hydraulic fluid used for control of a deactivation mechanism and blocking valve control passage 6230 used to control operation of the blocking valve 6208, both of which communicate with a bore 6240 formed in the rocker and in which a spool valve (piston) 6250 is deployed. As shown, the bore 6240 intersects the CDA passage 6220, whereas the blocking valve control passage 6230 communicates with one end (a closed end) of the bore 6240. As shown in FIG. 23, when the blocking valve control passage 6230 is not charged with pressurized hydraulic fluid, the spool valve 6250 is biased downward (as depicted) in the bore 6240 by a spool valve spring 6260 such that an annular channel 6270 in the spool valve aligns with the CDA passage 6220. In this case, any hydraulic fluid supplied by the CDA passage 6270 is permitted to flow past the spool valve 6250, through the rocker arm passage 6220 and, in the case where the deactivation mechanism is implemented as a collapsing valve bridge, through the nose or end 6224 of the rocker arm (via a further hydraulic passage not shown) to the collapsing valve bridge.

In contrast, as shown in FIG. 24, when the blocking valve control passage 6230 is charged with pressurized hydraulic fluid, the pressure exerted on the end of the spool valve 6250 is sufficient to overcome the bias applied by the spool valve spring 6260, thereby causing the spool valve to block the CDA passage 6270 and prevent flow of hydraulic fluid through the CDA passage 6220. In this manner, activation of the spool valve 6250 provides the desired blocking effect on operation of the CDA control.

Although the present implementations have been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system for controlling valve motion to facilitate cylinder deactivation and high-power density (HPD) engine braking in an internal combustion engine having at least one cylinder, the system comprising:
   a valve set associated with each cylinder of the at least one cylinder, each valve set comprising at least one intake valve and at least one exhaust valve;
   a main event motion system configured to produce main event motion in each valve set;
   an engine braking system configured to produce engine braking motion during an engine braking operation by adding motion to the at least one exhaust valve;
   a cylinder deactivation system configured to selectively deactivate main event motion of the at least one intake valve and the at least one exhaust valve; and
   a blocking system configured to selectively prevent the cylinder deactivation system from deactivating the main event motion of the at least one intake valve during the engine braking operation.

2. The system of claim 1, wherein the engine braking system is configured to produce at least two compression release events for each cycle of the internal combustion engine.

3. The system of claim 1, wherein the main event motion system comprises at least one valve bridge, and wherein the cylinder deactivation system includes a collapsing feature on the at least one valve bridge.

4. The system of claim 1, wherein the cylinder deactivation system is configured to deactivate the main event motion in response to hydraulic pressure, and wherein the blocking system is configured to prevent the hydraulic pressure in the cylinder deactivation system.

5. The system of claim 1, wherein the cylinder deactivation system is configured to activate the main event motion in response to hydraulic pressure, and wherein the blocking system is configured to permit the hydraulic pressure in the cylinder deactivation system.

6. The system of claim 1, wherein the engine braking system comprises a dedicated brake rocker associated with the at least one exhaust valve.

7. The system of claim 1, wherein the blocking system comprises a blocking solenoid valve arranged to control a flow of hydraulic fluid so as to selectively prevent the cylinder deactivation system from deactivating the main event motion of the at least one intake valve.

8. The system of claim 1, wherein the engine braking system comprises a brake solenoid valve arranged to control a flow of hydraulic fluid so as to produce the engine braking motion of the at least one exhaust valve.

9. The system of claim 1, wherein the cylinder deactivation system comprises a cylinder deactivation solenoid valve arranged to control a flow of hydraulic fluid so as to deactivate the main event motion of the at least one intake valve and the at least one exhaust valve.

10. The system of claim 1, wherein the blocking system comprises a valve disposed in a rocker arm and arranged to prevent flow in a hydraulic passage in the rocker arm.

11. The system of claim 1, wherein the blocking system comprises a valve arranged to selectively block flow of hydraulic fluid provided by a portion of the cylinder deactivation system, the flow of hydraulic fluid configured to deactivate the main event motion of the at least one intake valve.

12. The system of claim 1, wherein the blocking system comprises a valve disposed on a rocker shaft.

13. The system of claim 1, wherein the blocking system comprises a valve disposed on a solenoid valve manifold.

14. A method of controlling valve motion to facilitate cylinder deactivation and high-power density (HPD) engine braking in an internal combustion engine having at least one cylinder, the system comprising a valve set associated with each cylinder of the at least one cylinder, each valve set comprising at least one intake valve and at least one exhaust valve;
 a main event motion system for producing main event motion in each valve set;
 an engine braking system for producing engine braking valve motion during an engine braking operation by adding motion to the at least one exhaust valve; a cylinder deactivation system for selectively deactivating main event motion of the at least one intake valve and the at least one exhaust valve; and a blocking system for selectively preventing the cylinder deactivation system from deactivating the main event motion of the at least one intake valve during the engine braking operation, the method comprising:
 initiating a braking operation in the engine braking system for the valve set;
 initiating a cylinder deactivation operation in the cylinder deactivation system, the cylinder deactivation operation configured to deactivate the main event motion of the at least one intake valve and the at least one exhaust valve; and
 initiating a blocking operation in the blocking system which prevents the deactivation of the main event motion of the at least one intake valve during the engine braking operation.

15. The method of claim 14, further comprising providing at least two compression release events for each cycle of the internal combustion engine.

16. The method of claim 14, wherein the main event motion of the at least one intake valve enhances a compression release braking event performed in the engine braking operation.

17. The method of claim 14, wherein the blocking operation is performed via a blocking valve on a rocker arm.

18. The method of claim 14, wherein the blocking operation is performed via a blocking valve on a rocker shaft.

19. The method of claim 14, wherein the blocking operation is performed via a blocking valve on a solenoid manifold.

* * * * *